US007924219B2

(12) United States Patent
Mizuochi

(10) Patent No.: US 7,924,219 B2
(45) Date of Patent: Apr. 12, 2011

(54) POSITIONING METHOD, PROGRAM, POSITIONING DEVICE, AND ELECTRONIC APPARATUS

(75) Inventor: Shunichi Mizuochi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 287 days.

(21) Appl. No.: 12/246,813

(22) Filed: Oct. 7, 2008

(65) Prior Publication Data

US 2009/0096671 A1 Apr. 16, 2009

(30) Foreign Application Priority Data

Oct. 10, 2007 (JP) ................................. 2007-264208

(51) Int. Cl.
G01S 19/00 (2010.01)
G01S 1/00 (2006.01)
H04B 7/185 (2006.01)
(52) U.S. Cl. ............................. 342/357.2; 342/357.02
(58) Field of Classification Search ............. 342/357.02, 342/357.12
See application file for complete search history.

(56) References Cited

U.S. PATENT DOCUMENTS

| 5,757,316 | A  | * | 5/1998  | Buchler ................... 342/357.31 |
| 5,760,737 | A  | * | 6/1998  | Brenner ................... 342/357.58 |
| 5,929,805 | A  | * | 7/1999  | Tadros et al. ............. 342/357.27 |
| 6,609,080 | B1 | * | 8/2003  | Syrjarinne .................... 702/150 |
| 6,732,050 | B2 | * | 5/2004  | Syrjarinne .................... 701/213 |
| 6,876,925 | B2 | * | 4/2005  | Syrjarinne .................... 701/213 |
| 7,012,563 | B1 | * | 3/2006  | Bustamante et al. .... 342/357.62 |
| 7,414,573 | B2 | * | 8/2008  | Murphy .................... 342/357.21 |
| 7,415,354 | B2 | * | 8/2008  | Alexander ...................... 701/213 |
| 7,439,908 | B1 | * | 10/2008 | Zhodzishsky et al. ... 342/357.24 |
| 7,692,578 | B2 | * | 4/2010  | Vollath et al. ............ 342/357.27 |
| 7,755,542 | B2 | * | 7/2010  | Chen et al. ............... 342/357.24 |
| 7,777,673 | B2 | * | 8/2010  | Mizuochi et al. ........ 342/357.62 |
| 7,797,105 | B2 | * | 9/2010  | Alexander ...................... 701/213 |
| 2002/0177951 | A1 | * | 11/2002 | Syrjarinne .................... 701/213 |
| 2004/0138813 | A1 | * | 7/2004  | Syrjarinne .................... 701/213 |
| 2005/0058337 | A1 | * | 3/2005  | Fujimura et al. .............. 382/159 |
| 2009/0141779 | A1 | * | 6/2009  | Murakami ..................... 375/150 |

FOREIGN PATENT DOCUMENTS

JP 2001-337156 A 12/2001

OTHER PUBLICATIONS

Greg Welch and Gary Bishop, "An Introduction to the Kalman Filter", Jul. 24, 2006, Department of Computer Science, University of North Carolina.*
Butsch, Felix "Radiofrequency interference and GPS: A growing concern", Oct. 2002, GPS World.*

* cited by examiner

*Primary Examiner* — Thomas H Tarcza
*Assistant Examiner* — Frank McGue
(74) *Attorney, Agent, or Firm* — Global IP Counselors, LLP

(57) ABSTRACT

A positioning method includes: determining a receiving environment of a satellite signal from a positioning satellite; predicting a state vector including a position of a positioning device and a velocity of the positioning device based on the satellite signal; predicting a first distance-equivalent value indicating a distance between the positioning satellite and the positioning device; measuring a second distance-equivalent value indicating a distance between the positioning satellite and the positioning device; calculating an observed value indicating a difference between the first distance-equivalent value and the second distance-equivalent value; setting a first measurement error for the positioning satellite based on a signal strength of the satellite signal; setting a suitability condition of the observed value based on the receiving environment; setting a second measurement error larger than the first measurement error when the observed value is not suitable by the suitability condition; and correcting the state vector using the observed value and the second measurement error.

4 Claims, 16 Drawing Sheets

| SIGNAL STRENGTH [dBm] | REFERENCE POSITION R VALUE [m] |
|---|---|
| −130〜−135 | 10 |
| −135〜−140 | 25 |
| −140〜−142 | 50 |
| −142〜−145 | 100 |
| −145〜−150 | 150 |
| −150〜−155 | 200 |
| −155〜−160 | 300 |

POSITIONING METHOD, PROGRAM, POSITIONING DEVICE, AND ELECTRONIC APPARATUS

The present application claims the priority based on Japanese Patent Applications No. 2007-264208 filed on Oct. 10, 2007, the disclosures of which is hereby incorporated by reference in their entirety.

BACKGROUND

1. Technical Field

The present invention relates to a positioning method, a program, a positioning device, and an electronic apparatus.

2. Related Art

A GPS (global positioning system) is widely known as a positioning system using a satellite and is used in a positioning device built in a mobile phone, a car navigation apparatus, and the like. The GPS measures its current position by executing a positioning operation for calculating four parameter values of three-dimensional coordinate values, which indicate the position of the GPS, and a time error on the basis of information, such as the positions of a plurality of GPS satellites or a pseudo distance from each GPS satellite to the GPS.

However, in the positioning using a satellite signal transmitted from a positioning satellite, it is difficult to avoid generation of a positioning error because there are various kinds of error factors, such as multipath influence. For this reason, various techniques for reducing the positioning error have been proposed. As an example, a technique related to positioning processing using a Kalman filter is disclosed in JP-A-2001-337156.

The Kalman filter uses an estimation method based on the probability theory of estimating a state amount changing with time by using an observed value including a measurement error. In positioning processing using the Kalman filter, the current position of a positioning device is estimated, for example, by setting as an observed value a difference between an actual measurement value and a predicted value of a distance-equivalent value indicating a distance between a GPS satellite and the positioning device.

However, since it is difficult to see the measurement error included in the observed value correctly, calculation has been performed in a condition where the measurement error is set to a fixed value in the related art. In this case, however, since the measurement error largely deviates from a true value, position jump or position delay occurs in the position obtained in the positioning processing. As a result, there has been a problem that the positioning accuracy noticeably lowers.

SUMMARY

The invention has been finalized in view of the above-described problems.

In order to solve the above problems, according to a first aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between the captured satellite and the positioning device for every captured satellite includes: determining a receiving environment of the satellite signal from a positioning satellite; measuring the distance-equivalent value by executing capture processing for capturing the satellite signal from the positioning satellite; setting an initial value of a measurement error used in the correction processing for the captured satellite on the basis of a signal strength of the captured satellite signal; setting a suitability determination condition, which determines the suitability of execution of the correction processing using the observed value of the captured satellite on the basis of the observed value, on the basis of the determined receiving environment for each captured satellite; and setting the measurement error used in the correction processing to a larger value than the set initial value, for each captured satellite, when it is determined that the observed value of the captured satellite is not suitable by the set suitability determination condition.

Furthermore, according to a second aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: a receiving environment determining section that determines a receiving environment of the satellite signal from the positioning satellite; a capturing section that measures the distance-equivalent value by executing capture processing for capturing the satellite signal from the positioning satellite; a measurement error initial value setting section that sets an initial value of a measurement error used in the correction processing for the captured satellite on the basis of a signal strength of the captured satellite signal; a suitability determination condition setting section that sets a suitability determination condition, which determines the suitability of execution of the correction processing using the observed value of the captured satellite on the basis of the observed value, on the basis of the determined receiving environment for each captured satellite; and a measurement error setting section that sets the measurement error used in the correction processing to a larger value than the set initial value, for each captured satellite, when it is determined that the observed value of the captured satellite is not suitable by the set suitability determination condition.

According to the first aspect and the like of the invention, the distance-equivalent value is measured by executing the capture processing for capturing a satellite signal from the positioning satellite. Furthermore, an initial value of a measurement error used in the correction processing regarding the captured satellite is set on the basis of the signal strength of the captured satellite signal. However, when it is determined that the observed value of the captured satellite is not suitable by the suitability determination condition that is set on the basis of the receiving environment of the satellite signal from the positioning satellite, the measurement error used in the correction processing is set to a larger value than the initial value.

On the basis of the signal strength of the captured satellite signal, an approximate value of a measurement error included in the observed value is predicted to be set as an initial value. However, when it is determined that performing the correction processing using the observed value of the captured satellite is not suitable, it becomes possible to perform the correction processing using a more suitable measurement error by setting the measurement error to a larger value than the initial value. As a result, the positioning accuracy can be further improved.

Furthermore, according to a third aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: calculating a velocity of the positioning device by correcting the state vector using a difference between an actual measurement value and a predicted value of a reception frequency of the satellite signal from the captured satellite for every captured satellite; measuring the distance-equivalent value by executing capture processing for capturing the satellite signal from the positioning satellite; setting an initial value of a measurement error used in the correction processing for the captured satellite on the basis of a signal strength of the captured satellite signal; setting a suitability determination condition, which determines the suitability of execution of the correction processing using the observed value of the captured satellite on the basis of the observed value, on the basis of the calculated velocity for each captured satellite; and setting the measurement error used in the correction processing to a larger value than the set initial value, for each captured satellite, when it is determined that the observed value of the captured satellite is not suitable by the set suitability determination condition.

Furthermore, according to a fourth aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: a velocity calculating section that calculates a velocity of the positioning device by correcting the state vector using a difference between an actual measurement value and a predicted value of a reception frequency of the satellite signal from the captured satellite for every captured satellite; a capturing section that measures the distance-equivalent value by executing capture processing for capturing the satellite signal from the positioning satellite; a measurement error initial value setting section that sets an initial value of a measurement error used in the correction processing for the captured satellite on the basis of a signal strength of the captured satellite signal; a suitability determination condition setting section that sets a suitability determination condition, which determines the suitability of execution of the correction processing using the observed value of the captured satellite on the basis of the observed value, on the basis of the calculated velocity for each captured satellite; and a measurement error setting section that sets the measurement error used in the correction processing to a larger value than the set initial value, for each captured satellite, when it is determined that the observed value of the captured satellite is not suitable by the set suitability determination condition.

According to the third aspect and the like of the invention, the velocity of the positioning device is calculated by correcting the state vector using the difference of the actual measurement value and predicted value of the reception frequency of the satellite signal from the captured satellite for every captured satellite, and the distance-equivalent value is measured by executing the capture processing for capturing the satellite signal from the position satellite. Furthermore, an initial value of a measurement error used in the correction processing regarding the captured satellite is set on the basis of the signal strength of the captured satellite signal. However, when it is determined that the observed value of the captured satellite is not suitable by the suitability determination condition that is set on the basis of the calculated velocity, the measurement error used in the correction processing is set to a larger value than the initial value. Thus, the same effects as in the first aspect and the like are obtained.

Furthermore, according to a fifth aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: measuring the distance-equivalent value by executing capture processing for capturing the satellite signal from the positioning satellite; setting an initial value of a measurement error used in the correction processing for the captured satellite on the basis of a signal strength of the captured satellite signal; setting a suitability determination condition, which determines the suitability of execution of the correction processing using the observed value of the captured satellite on the basis of the observed value, on the basis of the signal strength of the satellite signal of the captured satellite for each captured satellite; and setting the measurement error used in the correction processing to a larger value than the set initial value, for each captured satellite, when it is determined that the observed value of the captured satellite is not suitable by the set suitability determination condition.

Furthermore, according to a sixth aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: a capturing section that measures the distance-equivalent value by executing capture processing for capturing the satellite signal from the positioning satellite; a measurement error initial value setting section that sets an initial value of a measurement error used in the correction processing for the captured satellite on the basis of a signal strength of the captured satellite signal; a suitability determination condition setting section that sets a suitability determination condition, which determines the suitability of execution of the correction processing using the observed value of the captured satellite on the basis of the observed value, on the basis of the signal strength of the satellite signal of the captured satellite for each captured satellite; and a measurement error setting section that sets the measurement error used in the correction processing to a larger value than the set initial value, for each captured satellite, when it is determined that the observed value of the captured satellite is not suitable by the set suitability determination condition.

According to the fifth aspect and the like of the invention, the distance-equivalent value is measured by executing the capture processing for capturing a satellite signal from the positioning satellite. Furthermore, an initial value of a measurement error used in the correction processing regarding the captured satellite is set on the basis of the signal strength of the captured satellite signal. However, when it is determined that the observed value of the captured satellite is not suitable by the suitability determination condition that is set on the basis of the signal strength of the satellite signal of the captured satellite, the measurement error used in the correction processing is set to a larger value than the initial value. Thus, the same effects as in the first aspect and the like are obtained.

Furthermore, according to a seventh aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: measuring the distance-equivalent value by executing capture processing for capturing the satellite signal from the positioning satellite; evaluating the reliability of the captured satellite signal on the basis of a correlation value of correlation processing executed in the capture processing; setting an initial value of a measurement error used in the correction processing for the captured satellite on the basis of a signal strength of the captured satellite signal; setting a suitability determination condition, which determines the suitability of execution of the correction processing using the observed value of the captured satellite on the basis of the observed value, on the basis of the evaluated reliability for each captured satellite; and setting the measurement error used in the correction processing to a larger value than the set initial value, for each captured satellite, when it is determined that the observed value of the captured satellite is not suitable by the set suitability determination condition.

Furthermore, according to an eighth aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: a capturing section that measures the distance-equivalent value by executing capture processing for capturing the satellite signal from the positioning satellite; a reliability evaluating section that evaluates the reliability of the captured satellite signal on the basis of a correlation value of correlation processing executed in the capture processing; a measurement error initial value setting section that sets an initial value of a measurement error used in the correction processing for the captured satellite on the basis of a signal strength of the captured satellite signal; a suitability determination condition setting section that sets a suitability determination condition, which determines the suitability of execution of the correction processing using the observed value of the captured satellite on the basis of the observed value, on the basis of the evaluated reliability for each captured satellite; and a measurement error setting section that sets the measurement error used in the correction processing to a larger value than the set initial value, for each captured satellite, when it is determined that the observed value of the captured satellite is not suitable by the set suitability determination condition.

According to the seventh aspect and the like of the invention, the distance-equivalent value is measured by executing the capture processing for capturing the satellite signal from the positioning satellite and the reliability of the captured satellite signal is evaluated on the basis of the correlation value of the correlation processing executed in the capture processing. Furthermore, an initial value of a measurement error used in the correction processing regarding the captured satellite is set on the basis of the signal strength of the captured satellite signal. However, when it is determined that the observed value of the captured satellite is not suitable by the suitability determination condition that is set on the basis of the evaluated reliability, the measurement error used in the correction processing is set to a larger value than the initial value. Thus, the same effects as in the first aspect and the like are obtained.

Furthermore, according to a ninth aspect of the invention, a positioning method in a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: determining a receiving environment of the satellite signal from the positioning satellite; measuring the distance-equivalent value by selecting capture processing for capturing the satellite signal from the positioning satellite from a plurality of capture processing modes set beforehand to thereby selectively execute the capture processing according to the determined receiving environment; setting an initial value of a measurement error used in the correction processing for the captured satellite on the basis of a signal strength of the captured satellite signal; setting a suitability determination condition, which is used to determine the suitability of execution of the correction processing using the observed value of the captured satellite on the basis of the observed value, on the basis of the capture processing mode of the executed capture processing for each captured satellite; and setting the measurement error used in the correction processing to a larger value than the set initial value, for each captured satellite, when it is determined that the observed value of the captured satellite is not suitable by the set suitability determination condition.

Furthermore, according to a tenth aspect of the invention, a positioning device that measures a current position by executing Kalman filter processing including prediction processing for predicting a state vector having position and velocity of the positioning device as elements after capturing a satellite signal from a positioning satellite and correction processing for correcting the state vector using as an observed value a difference between an actual measurement value and a predicted value of a distance-equivalent value indicating a distance between a corresponding captured satellite and the positioning device for every captured satellite includes: a receiving environment determining section that determines a receiving environment of the satellite signal from the positioning satellite; a capturing section that measures the distance-equivalent value by selecting capture processing for capturing the satellite signal from the positioning satellite from a plurality of capture processing modes set beforehand to thereby selectively execute the capture processing according to the determined receiving environment; a measurement error initial value setting section that sets an initial value of a measurement error used in the correction processing for the captured satellite on the basis of a signal strength of the captured satellite signal; a suitability determination condition setting section that sets a suitability determination condition, which determines the suitability of execution of the correction processing using the observed value of the captured satellite on the basis of the observed value, on the basis of the capture processing mode of the executed capture processing for each captured satellite; and a measurement error setting section that sets the measurement error used in the correction processing to a larger value than the set initial value, for each captured satellite, when it is determined that the observed value of the captured satellite is not suitable by the set suitability determination condition.

According to the ninth aspect and the like of the invention, the distance-equivalent value is measured by selecting capture processing for capturing the satellite signal from the positioning satellite from the plurality of capture processing modes set beforehand to thereby selectively execute the capture processing according to the receiving environment of the satellite signal. Furthermore, an initial value of a measurement error used in the correction processing regarding the captured satellite is set on the basis of the signal strength of the captured satellite signal. However, when it is determined that the observed value of the captured satellite is not suitable by the suitability determination condition that is set on the capture processing mode of execute capture processing, the measurement error used in the correction processing is set to a larger value than the initial value. Thus, the same effects as in the first aspect and the like are obtained.

Furthermore, according to an eleventh aspect of the invention, there is provided a program causing a computer provided in a positioning device to execute the positioning method according to anyone of the first, third, fifth, seventh, and ninth aspects of the invention. In addition, according to a twelfth aspect of the invention, there is provided an electronic apparatus including the positioning device according to any one of the second, fourth, sixth, eighth, and tenth aspects of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
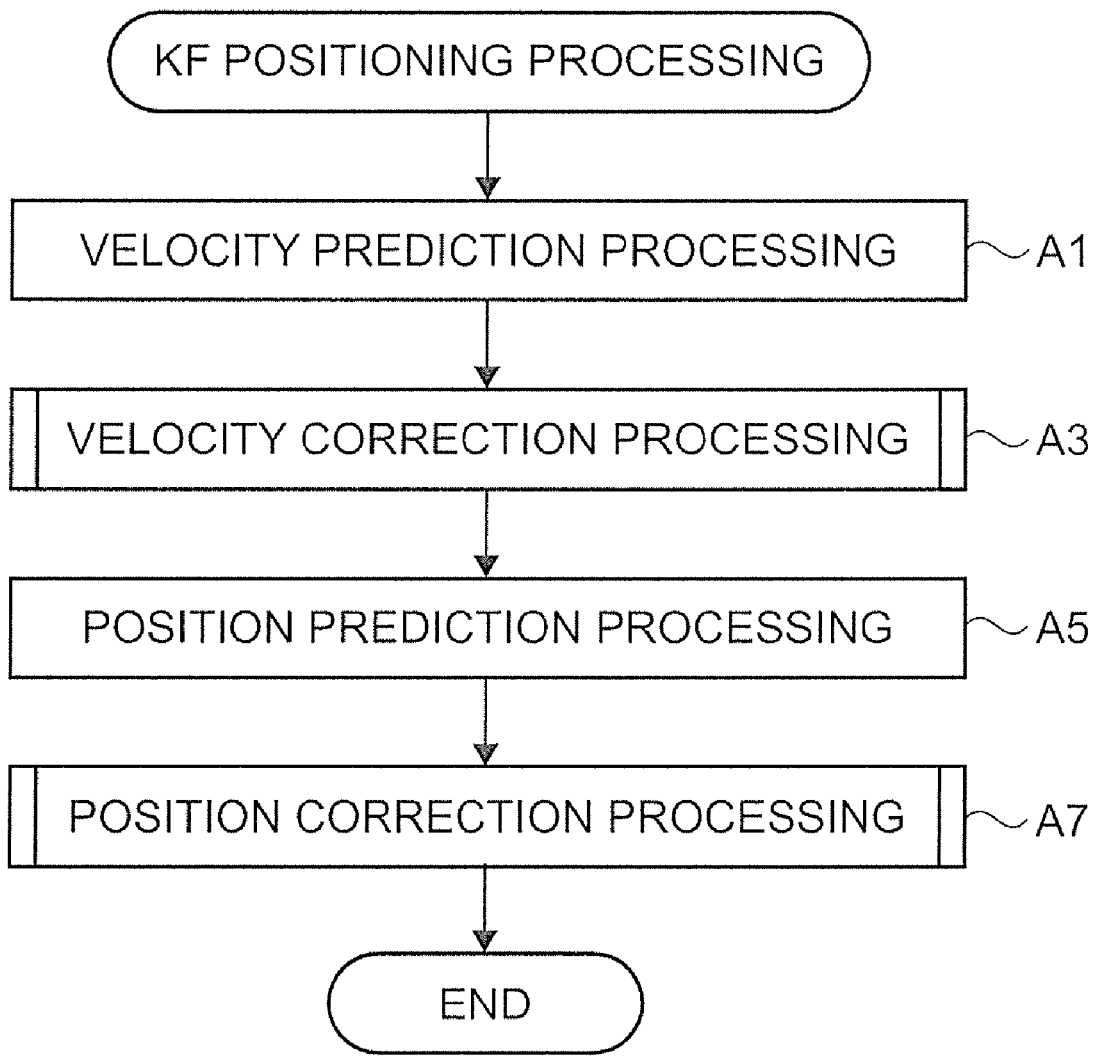
FIG. 1 is a flow chart illustrating the flow of KF positioning processing.

Hereinafter, a preferred embodiment of the invention will be described with reference to the accompanying drawings. In addition, a case where a mobile phone is mentioned as an example of an electronic apparatus including a positioning device and a GPS is used as a positioning system will be described below. However, an embodiment to which the invention can be applied is not limited to the above case.

1. Principles

A mobile phone 1 receives a GPS satellite signal as a positioning signal transmitted (emitted) from a GPS satellite which is a positioning satellite and calculates satellite information, such as the position, movement direction, and velocity of the GPS satellite, on the basis of a navigation message, such as orbital information (ephemeris data and almanac data) on the GPS satellite superimposed on the received GPS satellite signal. The GPS satellite signal is a signal, which is obtained by spread spectrum modulation and is called a C/A (coarse and acquisition) code, and is superimposed on a carrier which has a carrier frequency of 1.57542 [GHz] and is in a band of L1.

In addition, four GPS satellites are disposed on each of six orbital surfaces and are operated, in principle, such that four or more satellites can always be observed under geometric arrangement from anywhere on the earth. In the following description, a GPS satellite that has transmitted a captured GPS satellite signal is referred to as a 'captured satellite' in order to distinguish the GPS satellite from other GPS satellites.

In addition, the mobile phone 1 calculates an electric wave propagation time from the captured satellite to the mobile phone 1 on the basis of a difference between a time when a GPS satellite signal specified by a built-in crystal clock has been received and a time when the GPS satellite has transmitted the received GPS satellite signal. In addition, the distance (pseudo distance) from the captured satellite to the mobile phone 1 is calculated by multiplying the calculated electric wave propagation time by the speed of light.

The mobile phone 1 measures its current position by executing a positioning operation for calculating four parameter values of three-dimensional coordinate values, which indicate the position of the mobile phone 1, and a time error on the basis of satellite information on a plurality of captured satellites or information on a distance (pseudo distance) from each captured satellite to the mobile phone 1, for example.

In the present embodiment, the mobile phone 1 measures its current position by performing positioning processing (hereinafter, referred to as 'LS (least square) positioning processing') using a least square method at the time of first positioning after the start of the GPS and by performing positioning processing (hereinafter, referred to as 'KF (Kalman filter) positioning processing') using a Kalman filter at the time of second and subsequent positioning. Since the LS positioning processing is well-known processing, an explanation thereof will be omitted. Here, the KF positioning processing in the present embodiment will be described in detail.

The Kalman filter uses an estimation method based on the probability theory of estimating a state amount changing with time by using an observed value including a measurement error. In the present embodiment, a state of the mobile phone 1 is expressed as a state vector 'X', and the covariance of an error between the state vector 'X' and a true value is expressed as an error covariance matrix 'P'.

The state vector 'X' is an eight-dimensional vector having three-dimensional position vector (x, y, z), clock bias (b), three-dimensional velocity vector (u, v, w), and clock drift (d) of the mobile phone 1 as elements. In addition, the error covariance matrix 'P' is a matrix of 8×8 indicating the covariance of the error of each element of the state vector 'X'.

In the KF positioning processing, prediction and correction of the state vector 'X' and error covariance matrix 'P' are performed. In the following description, a unit indicating a temporal change (predetermined time interval in calculation processing) in the calculation processing is referred to as '1 time', and the current position of the mobile phone 1 is measured for each time while progressing the time one by one.

FIG. 1 is a flow chart illustrating the flow of KF positioning processing in the present embodiment.

First, velocity prediction processing for predicting the velocity of the mobile phone 1 is performed (step A1). Specifically, predicted values of the current state vector 'X' and error covariance matrix 'P' are calculated according to expressions (1) and (2).

$$X_t^- = X_{t-1}^+ \quad (1)$$

$$P_t^- = \phi_t P_{t-1}^+ \phi_t^T + Q_{t-1} \quad (2)$$

Here, a suffix 't' added below in each expression denotes a time, a suffix '−' added above denotes a predicted value, a suffix '+' added above denotes a correction value, and a suffix 'T' added above denotes a transposed matrix. In addition, 'φ' is a matrix of 8×8 called a state transition matrix, and 'Q' is a matrix of 8×8 called a process noise. Lines of row and columns of the state transition matrix 'φ' and process noise 'Q' correspond to the eight-dimensional components (x, y, z, b, u, v, w, d) of the state vector 'X'.

In the present embodiment, calculation is performed by using the state transition matrix 'φ' expressed by the following expression (3).

$$\phi = \begin{bmatrix} 1 & 0 & 0 & 0 & dt & 0 & 0 & 0 \\ 0 & 1 & 0 & 0 & 0 & dt & 0 & 0 \\ 0 & 0 & 1 & 0 & 0 & 0 & dt & 0 \\ 0 & 0 & 0 & 1 & 0 & 0 & 0 & dt \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad (3)$$

Here, 'dt' is a time difference between a time when last KF positioning processing was performed and a current time.

As can be seen from the expression (1), a correction value of the state vector 'X' before 1 time is set to a predicted value of the current state vector 'X' in the velocity prediction processing. That is, it is predicted whether or not the current velocity of the mobile phone 1 is the same as the velocity calculated before 1 time. After performing the velocity prediction processing, velocity correction processing for correcting the predicted velocity is performed (step A3).

Figure 2:
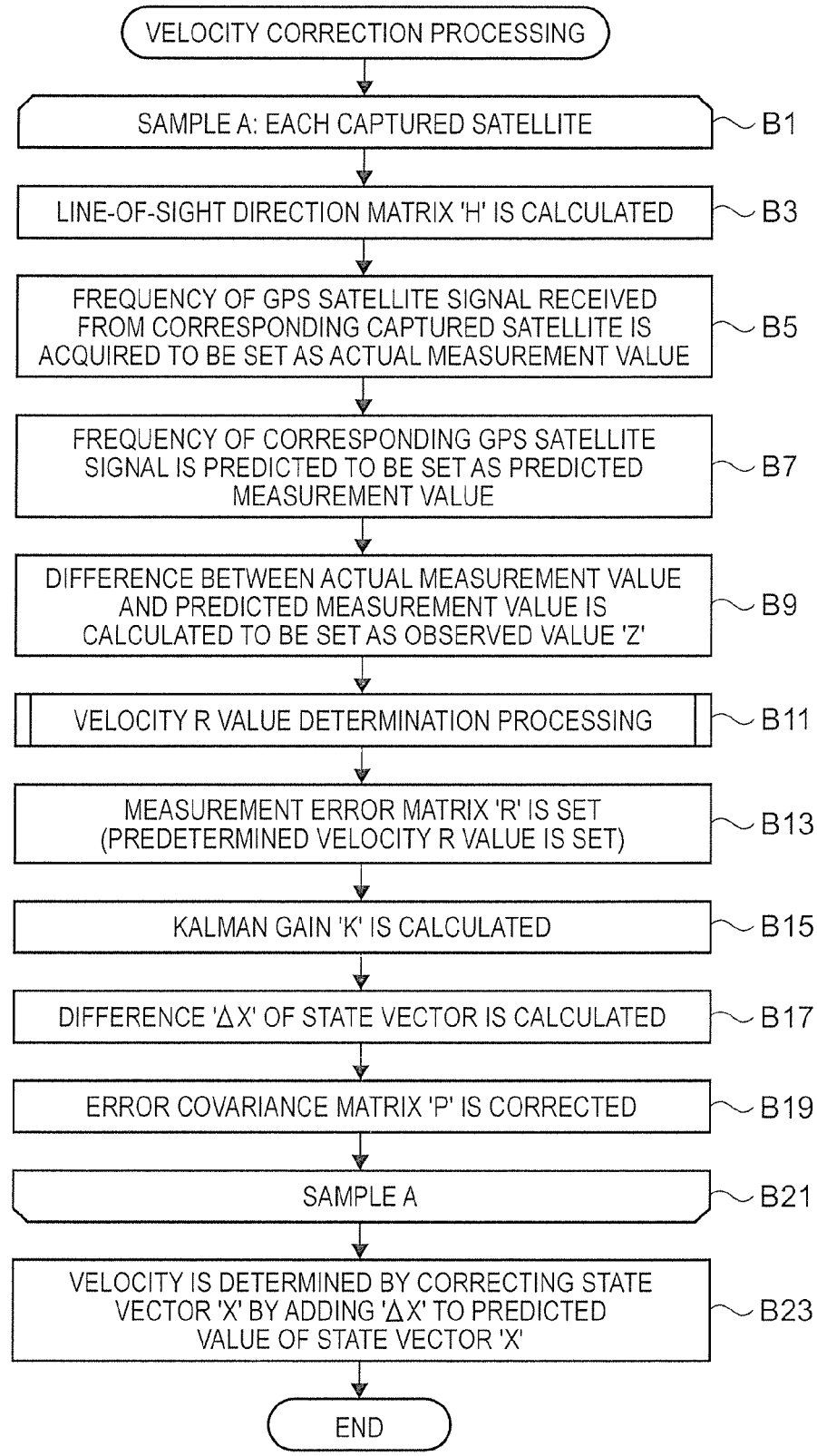
FIG. 2 is a flow chart illustrating the flow of velocity correction processing.

FIG. 2 is a flow chart illustrating the flow of velocity correction processing.

In the velocity correction processing, processing of a loop A is repeatedly executed for each captured satellite (steps B1 to B21). In the loop A, a line-of-sight direction matrix 'H' indicating the line-of-sight direction from the mobile phone 1 to the corresponding captured satellite is first calculated on the basis of information (satellite information) on the position, movement direction, and velocity of the captured satellite and information (hereinafter, comprehensively referred to as 'own information') on the position, movement direction, and velocity of the mobile phone 1 obtained from the predicted value of the state vector 'X' (step B3).

Then, a reception frequency used to receive a GPS satellite signal from the captured satellite is acquired to be set as an actual measurement value regarding the reception frequency (hereinafter, an actual measurement value regarding the received GPS satellite signal is referred to as an 'actual measurement value') (step B5). Although a frequency of the GPS satellite signal is specified as 1.57542 [GHz], the reception frequency in the mobile phone 1 changes according to changes in relative movement direction and movement velocity of the GPS satellite and the mobile phone 1. This frequency shift is a so-called Doppler frequency, and the reception frequency is a frequency after shift caused by the Doppler frequency.

Thereafter, a reception frequency of the GPS satellite signal is predicted on the basis of the satellite information on the captured satellite and the own information and is set as a predicted value (hereinafter, a value obtained by predicting the actual measurement value is referred to as a 'predicted measurement value') (step B7). Then, a difference between the actual measurement value obtained in step B5 and the predicted measurement value calculated in step B7 regarding the reception frequency is calculated to be set as an observed value 'Z' of the captured satellite (step B9).

By using the difference between the actual measurement value and predicted value of the reception frequency of the GPS satellite signal as an input value of the Kalman filter, the variation of the three-dimensional velocity vector (u, v, w) and clock drift (d) of the state vector 'X' can be calculated. In this case, the variation of the three-dimensional position vector (x, y, z) and clock bias (b) of the state vector 'X' is '0'.

Then, velocity R value determination processing for determining a value (hereinafter, referred to as a 'velocity R value') of a measurement error of the observed value 'Z' used in the velocity correction processing is performed (step B11). The velocity R value determination processing will be described in detail later.

Then, a predetermined measurement error matrix 'R' having the velocity R value determined in step B11 as an element (step B13). Then, a Kalman gain 'K' is calculated according to the following expression (4) using the predicted value of the error covariance matrix 'P' calculated in the velocity prediction processing, the line-of-sight direction matrix 'H', and the measurement error matrix 'R' (step B15).

$$K_t = P_t^- H_t^T (H_t P_t^- H_t^T + R_t)^{-1} \quad (4)$$

Then, a difference '$\Delta X$' of the state vector is calculated according to the following expression (5) using the Kalman gain 'K', the observed value 'Z', and the line-of-sight direction matrix 'H' (step B17).

$$\Delta X_t = \Delta X_t + K_t(Z_t - H_t \Delta X_t) \quad (5)$$

Then, the error covariance matrix 'P' is corrected according to the following expression (6) using the Kalman gain 'K', the line-of-sight direction matrix 'H', and the predicted value of the error covariance matrix 'P' (step B19). Here, 'I' is a unit matrix.

$$P_t^+ = (I - K_t H_t) P_t^- \quad (6)$$

Here, 'I' is a unit matrix.

The difference '$\Delta X$' of the state vector and the error covariance matrix 'P' are updated while sequentially performing the processing in steps B3 to B19 for all captured satellites. Then, the velocity of the mobile phone 1 is determined by correcting the state vector 'X' by adding the difference '$\Delta X$' of the state vector to the predicted value of the state vector 'X' calculated in the velocity prediction processing according to the following expression (7) (step B23).

$$X_t^+ = X_t^- + \Delta X_t \quad (7)$$

In the state vector 'X' obtained in step B23, the three-dimensional velocity vector (u, v, w) and the clock drift (d) are corrected from predicted values, respectively. This is done by calculating the difference '$\Delta X$' of the state vector using, as the observed value 'Z', the difference between the actual measurement value and predicted measurement value regarding the reception frequency of the GPS satellite signal, as described above. The velocity expressed by the three-dimensional velocity vector (u, v, w) of the state vector 'X' after correction is a velocity of current time.

Returning to the KF positioning processing of FIG. 1, velocity correction processing is performed and then position prediction processing for predicting the position of the mobile phone 1 is performed (step A5). Specifically, the predicted value of the state vector 'X' is calculated by multiplying the correction value of the state vector 'X' obtained in the velocity correction processing by the state transition matrix '$\phi$' according to the following expression (8).

$$X_t^- = \phi X_t^+ \quad (8)$$

As can be seen from the expression (3), diagonal elements of a matrix portion of 3×3 corresponding to the three-dimensional velocity vector (u, v, w) of the state transition matrix '$\phi$' are set as a time difference 'dt' between a last time and a current time. Therefore, in the case when the correction value of the state vector 'X' is multiplied by the state transition matrix '$\phi$', noting the position elements, a current predicted position of the mobile phone 1 is calculated by adding a predicted moving distance to the measured position before 1 time. After performing the position prediction processing, position correction processing for correcting the prediction position is performed (step A7).

Figure 3:
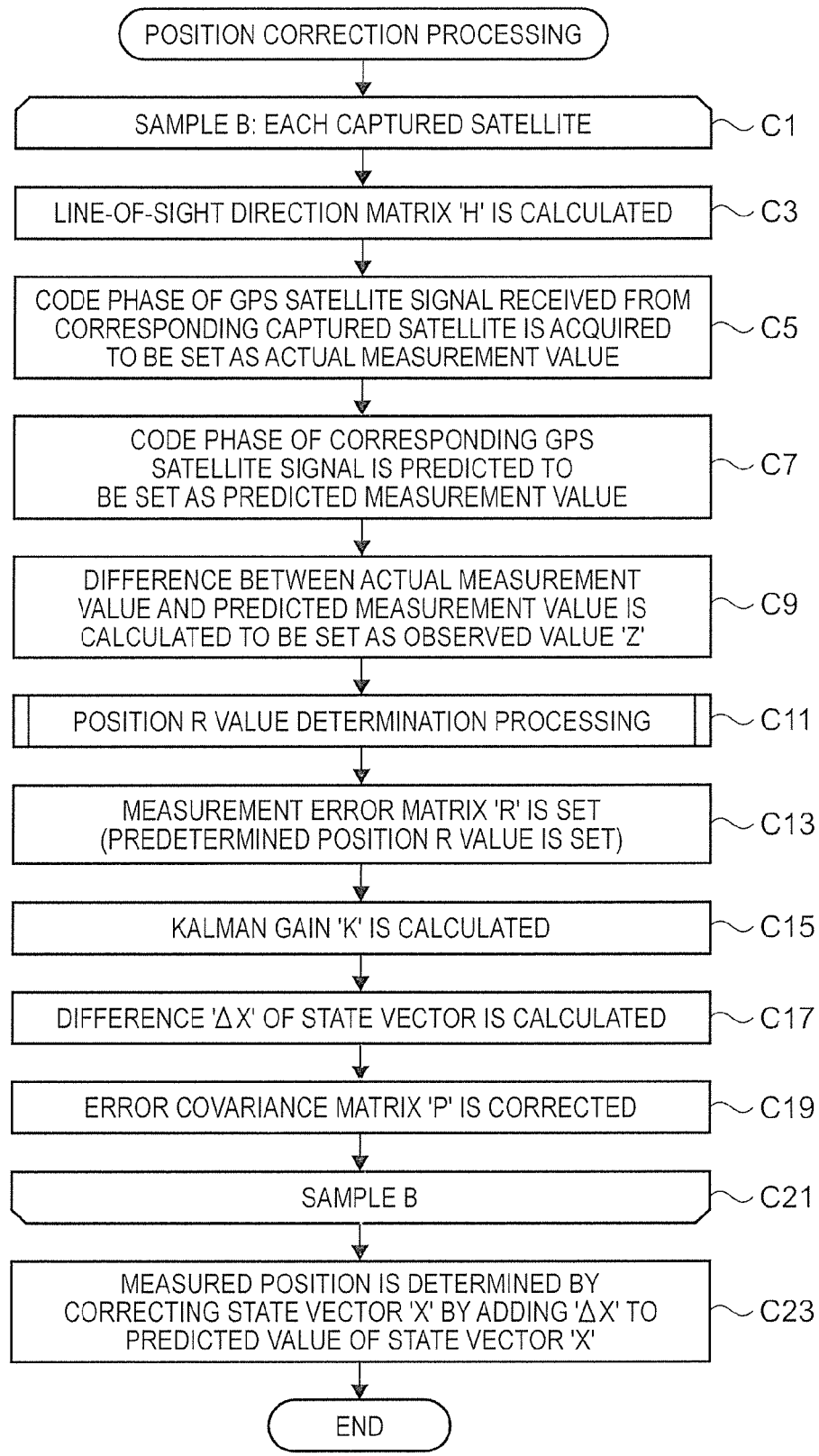
FIG. 3 is a flow chart illustrating the flow of position correction processing.

FIG. 3 is a flow chart illustrating the flow of position correction processing.

Since the flow of the position correction processing is almost the same as that of the velocity correction processing, the following explanation will be focused on different parts. In the position correction processing, a code phase of the GPS satellite signal received from the captured satellite is acquired to be set as an actual measurement value regarding a code phase (step C5), and a code phase of the GPS satellite signal is predicted to be set as the predicted measurement value regarding a code phase (step C7). Then, a difference between the actual measurement value and predicted measurement value regarding the code phase is calculated to be set as the observed value 'Z' which is an input value of the Kalman filter (step C9).

Here, the code phase is a phase of the C/A code modulated into the GPS satellite signal and is a distance-equivalent value indicating a distance between the GPS satellite and the mobile phone 1. Ideally, it may be regarded that C/A codes are continuously arrayed between the GPS satellite and the mobile phone 1. However, the distance from the GPS satellite to the mobile phone 1 does not necessarily be the integral multiple of the length of the C/A code. In this case, the length obtained by adding a fractional part to the integral multiple of the length of the C/A code becomes the distance between the GPS satellite and the mobile phone 1, and a phase equivalent to the fractional part is the code phase.

In addition, since the code phase may also be expressed as a distance, performing the position correction processing using the difference between the actual measurement value and predicted measurement value regarding the code phase as the observed value 'Z' is equivalent to performing the position correction processing using, as the observed value 'Z', a difference between the actual measurement value and predicted value of the distance (length obtained by adding the fractional part to the integral multiple of the length of the C/A code) between the captured satellite and the mobile phone 1. Accordingly, it can be said that the code phase is a value equivalent to the distance between the captured satellite and the mobile phone 1.

By setting the difference between the actual measurement value and predicted measurement value regarding the code phase of the GPS satellite signal as an input value of the Kalman filter, the variation of the three-dimensional position vector (x, y, z) and clock bias (b) of the state vector 'X' can be calculated. In this case, the variation of the three-dimensional velocity vector (u, v, w) and clock drift (d) is '0'.

In addition, in the position correction processing, position R value determination processing which is processing for determining a value (hereinafter, referred to as a 'position R value') of a measurement error of the observed value 'Z' used in the position correction processing is performed in step C11.

The position R value determination processing is processing for determining a position R value by changing an initial value (hereinafter, referred to as a 'reference position R value') of the position R value, which is set on the basis of the signal strength of the GPS satellite signal received from the captured satellite, on the basis of the observed value 'Z' calculated in step C9 or information such as the reliability of the GPS satellite signal. The position R value determination processing is one of the peculiar processing in the present embodiment. This position R value determination processing will be described in detail later.

The difference '$\Delta X$' of the state vector and the error covariance matrix 'P' are updated while sequentially performing the processing in steps C3 to C19 for all captured satellites. Then, the position of the mobile phone 1 is determined by correcting the state vector 'X' by adding the difference '$\Delta X$' of the state vector to the predicted value of the state vector 'X' calculated in the position prediction processing according to the following expression (7) (step C23).

In the state vector 'X' obtained in step C23, the three-dimensional position vector (x, y, z) and the clock bias (b) are corrected from predicted values, respectively. This is done by calculating the difference '$\Delta X$' of the state vector using, as the observed value 'Z', the difference between the actual measurement value and predicted value regarding the code phase of the GPS satellite signal, as described above. The position expressed by the three-dimensional position vector (x, y, z) of the state vector 'X' after correction is a measured position of current time that is finally calculated.

2. Functional Configuration

Figure 4:
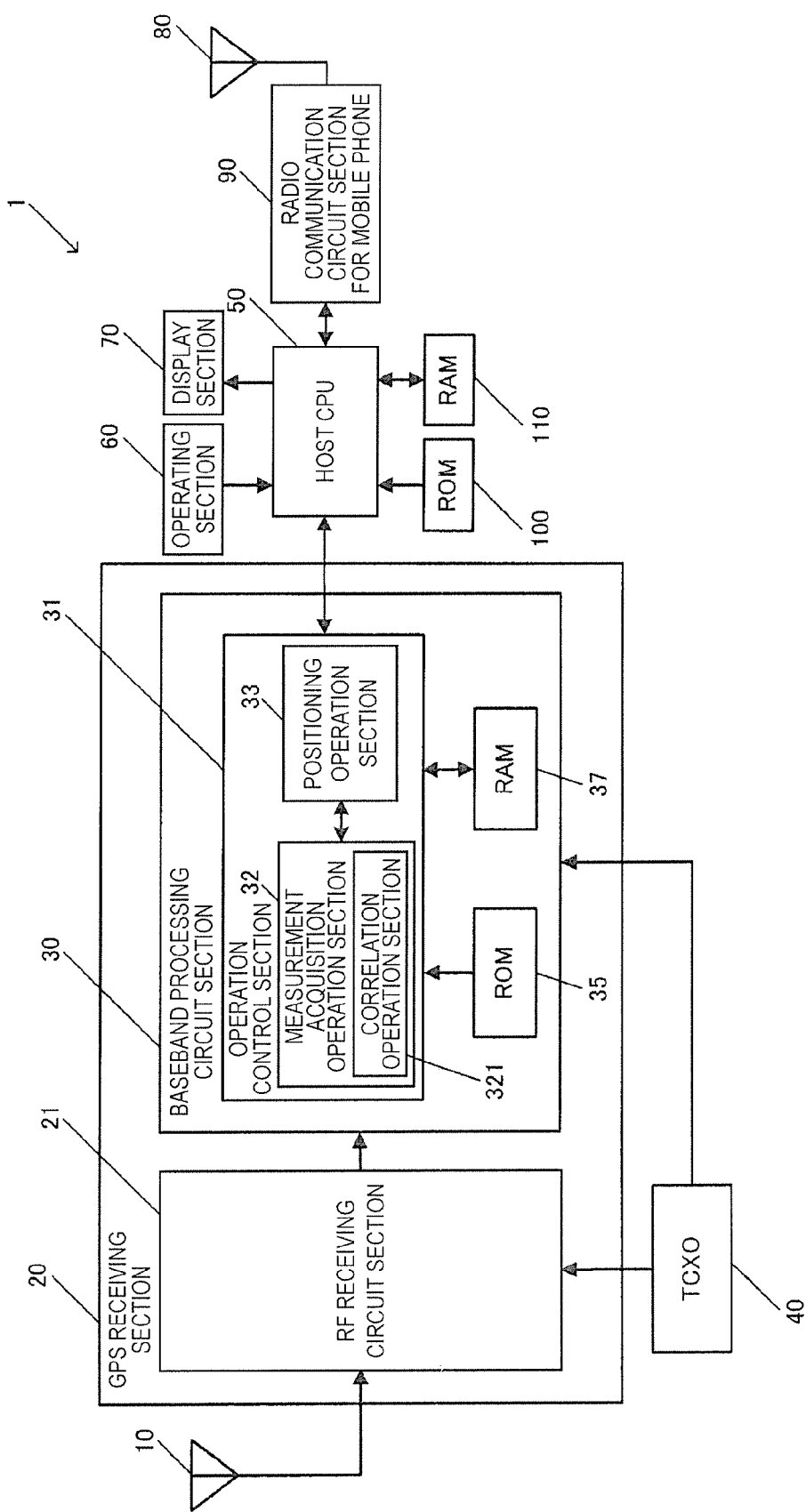
FIG. 4 is a block diagram illustrating the functional configuration of a mobile phone.

FIG. 4 is a block diagram illustrating the functional configuration of the mobile phone 1. The mobile phone 1 is configured to include a GPS antenna 10, a GPS receiving section 20, a TCXO (temperature compensated crystal oscillator) 40, a host CPU (central processing unit) 50, an operating section 60, a display section 70, a mobile phone antenna 80, a radio communication circuit section 90 for mobile phone, a ROM (read only memory) 100, and a RAM (random access memory) 110.

The GPS antenna 10 is an antenna that receives an RF signal including a GPS satellite signal transmitted from the GPS satellite, and outputs the received signal to the GPS receiving section 20.

The GPS receiving section 20 is a positioning section that measures the current position of the mobile phone 1 on the basis of a signal output from the GPS antenna 10, and is a functional block equivalent to a so-called GPS receiver. The GPS receiving section 20 is configured to include an RF (radio frequency) receiving circuit section 21 and a baseband processing circuit section 30. In addition, the RF receiving circuit section 21 and the baseband processing circuit section 30 may be manufactured as separate LSIs (large scale integration) or may be manufactured as one chip.

The RF receiving circuit section 21 is a circuit block of a high-frequency signal (RF signal) and generates an oscillation signal for RF signal multiplication by dividing or multiplying an oscillation signal generated by the TCXO 40. Then, the RF signal is down-converted into a signal (hereinafter, referred to as an 'IF (intermediate frequency) signal') having an intermediate frequency by multiplying the RF signal output from the GPS antenna 10 by the generated oscillation signal, multiplication and the like of the IF signal are performed, and then the IF signal is converted into a digital signal by an A/D converter to be output to the baseband processing circuit section 30.

The baseband processing circuit section 30 is a circuit section that captures and extracts a GPS satellite signal by performing correlation processing and the like on the IF signal output from the RF receiving circuit section 21 and performs a positioning operation by decoding data to obtain a navigation message, time information, and the like. The baseband processing circuit section 30 is configured to include an operation control section 31, a ROM 35, and a RAM 37. In addition, the operation control section 31 is configured to include a measurement acquisition operation section 32 and a positioning operation section 33.

In addition, the measurement acquisition operation section 32 and the positioning operation section 33 may be manufactured as separate LSIs or may be manufactured as one chip. In addition, although it is explained in the present embodiment that the positioning operation of the current position is executed in the positioning operation section 33, it is needless to say that all processing executed in the positioning operation section 33 may be executed by the host CPU 50.

The measurement acquisition operation section 32 is a circuit section that captures and tracks a GPS satellite signal from the received signal (IF signal), which is output from the RF receiving circuit section 21, and is configured to include a correlation operation section 321. The measurement acquisition operation section 32 acquires information, such as a reception frequency or a code phase of the GPS satellite signal that has been captured and tracked, and outputs the information to the positioning operation section 33 as a actual measurement value.

The correlation operation section 321 captures a GPS satellite signal while switching two kinds of satellite signal capture modes of 'indoor capture mode' and 'outdoor capture mode'. The 'indoor capture mode' is a capture mode in a case where the mobile phone 1 is assumed to be located indoors. In the 'indoor capture mode', the GPS satellite signal is captured by performing coherent processing (correlation processing) for calculating correlation between a replica code and a C/A code included in the received signal using FFT operation, for example, and performing incoherent processing (correlation value integration processing) for calculating an integrated correlation value by integrating a correlation value, which is a result of the coherent processing, for predetermined seconds (for example, '1 second').

In addition, the 'outdoor capture mode' is a capture mode in a case where the mobile phone 1 is assumed to be located outdoors. In the 'outdoor capture mode', coherent processing (correlation processing) is performed in the same manner as in the 'indoor capture mode', but the GPS satellite signal is captured by calculating an average correlation value obtained by averaging a correlation value, which is a result of the coherent processing, by predetermined seconds (for example, '1 second').

The correlation operation section 321 performs switching of the satellite signal capture modes according to the control of the positioning operation section 33. Specifically, the positioning operation section 33 makes a control to capture a GPS satellite signal in the 'outdoor capture mode' when a receiving environment of the GPS satellite signal is good (when the signal strength is equal to or larger than a predetermined value) or when the correlation value which is a result of coherent processing is large and makes a control to capture a GPS satellite signal in the 'indoor capture mode' when the receiving environment of the GPS satellite signal is not good (when the signal strength is smaller than the predetermined value) or when the correlation value which is a result of coherent processing is small.

In the present embodiment, an explanation will be made assuming that three kinds of environments of 'weak electric field environment', 'middle electric field environment', and 'strong electric field environment' exist as the receiving environment of a GPS satellite signal. The receiving environment may be determined on the basis of the signal strength of a GPS satellite signal captured and a PDOP (position dilution of precision) value which is an index value of satellite arrangement, for example. Since the details are known, an explanation thereof will be omitted.

In addition, the replica code is a simulated signal of the C/A code which is a kind of PRN (pseudo random noise) code included in the GPS satellite signal which is generated in a pseudo manner and is captured. The C/A code has 1023 chips.

If a GPS satellite signal to be captured is right, a C/A code and a replica code included in the GPS satellite signal match each other (capture success). If wrong, the C/A code and the replica code included in the GPS satellite signal do not match (capture failure). Accordingly, it can be determined whether or not capturing of a GPS satellite signal has succeeded by determining the peak of the calculated integrated correlation value or average correlation value. Thus, the GPS satellite signal can be captured by performing a correlation operation with the same received signal while sequentially changing a replica code.

Furthermore, the correlation operation section 321 performs the coherent processing while changing a frequency of a generated signal of a replica code and a phase when a correlation operation of the C/A code and the replica code is performed. When the frequency of the generated signal of the replica code and the frequency of the received signal match each other and the phases at the time of the correlation operation of the C/A code and the replica code match each other, the integrated correlation value or the average correlation value becomes a maximum.

More specifically, ranges of predetermined frequency and code phase corresponding to a GPS satellite signal to be captured are set as search ranges, and a correlation operation in the phase direction for detecting the start position (code phase) of a C/A code and a correlation operation in the frequency direction for detecting a frequency are performed within the above search ranges. The search range related to the frequency is set within a predetermined frequency sweep range having 1.57542 [GHz], which is a carrier frequency of the GPS satellite signal, as a center frequency and the search range related to the phase is set within a code phase range of 1023 chips which are the chip length of the C/A code.

The GPS satellite signal may be captured with higher precision as the frequency sweep interval becomes small. In this case, however, a time required for capturing the GPS satellite signals becomes long. In the outdoor capture mode, the correlation operation section 321 performs a correlation operation at large frequency sweep intervals (for example, '4 Hz') at first, but performs the correlation operation at very narrow frequency sweep intervals (for example, '0.2 Hz') in a final stage while gradually decreasing the frequency sweep interval. That is, the correlation operation section 321 roughly searches a frequency of a GPS satellite signal at first but gradually changes to search the frequency precisely. In addition, in the indoor capture mode, the correlation operation is performed at very large frequency sweep intervals, for example, 50 [Hz].

Figure 5:
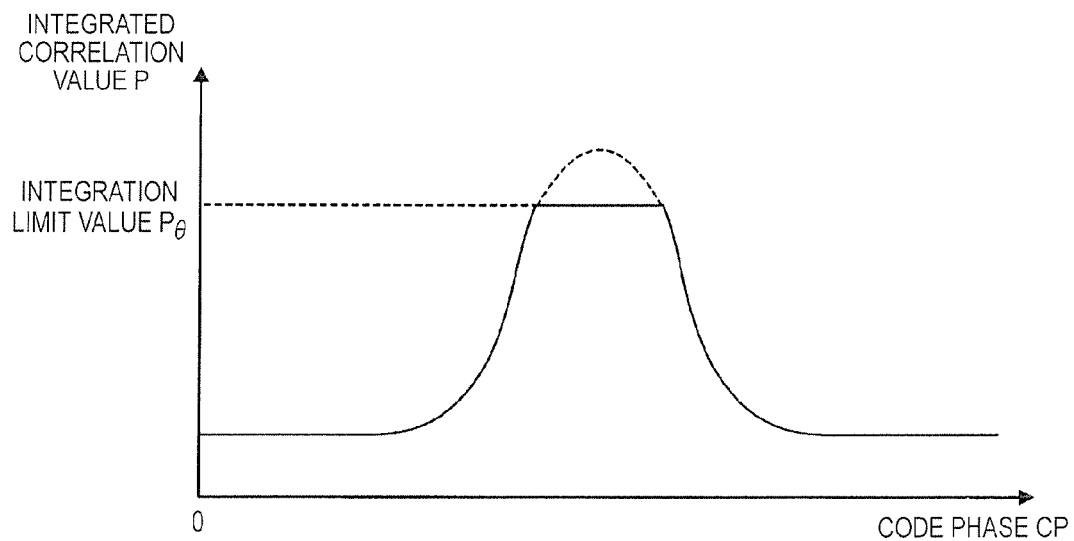
FIG. 5 is a view explaining a method of determining the peak existence of an integrated correlation value.

FIG. 5 is a view explaining a method of determining whether or not the peak of an integrated correlation value exists. In FIG. 5, the correspondence relationship between a code phase and an integrated correlation value in a predetermined frequency is schematically shown in a state where the horizontal axis indicates a code phase CP and the vertical axis indicates an integrated correlation value P. In addition, since a determination on whether or not the peak of an average correlation value exists may be similarly made, a method of determining the existence of the peak of an integration correlation value will be herein described.

The correlation operation section 321 integrates the correlation value. However, since there is a limit in a value that can be integrated in terms of a circuit (memory capacity), integration exceeding the limit value cannot be executed. FIG. 5 is an example in a case where integration exceeding an integration limit value $P_\theta$ is executed. A part exceeding the integration limit value $P_\theta$ is set to the integration limit value $P_\theta$. As a result, since the code phase CP having a maximum integrated correlation value (integration limit value $P_\theta$) exists in a plural number, determination of the peak cannot be made. Then, the measurement acquisition operation section 32 makes a determination on whether or not the peak exists as follows. That is, the measurement acquisition operation section 32 determines that there is no peak if the maximum integrated correlation value calculated by the correlation operation section 321 reaches the integration limit value $P_\theta$ and determines that there is a peak if the maximum integrated correlation value does not reach the integration limit value $P_\theta$.

In addition, the measurement acquisition operation section 32 evaluates the reliability of the GPS satellite signal of the captured satellite and outputs the evaluated reliability to the positioning operation section 33, separately from the actual measurement value. Specifically, on the basis of a result of the correlation operation performed by the correlation operation section 321, a reliability index XPR (hereinafter, simply referred to as an 'XPR') is calculated and the XPR is classified into five-step evaluation levels. Then, captured satellite signal reliability information obtained by matching the XPR with the evaluation level is output to the positioning operation section 33.

Figure 6:
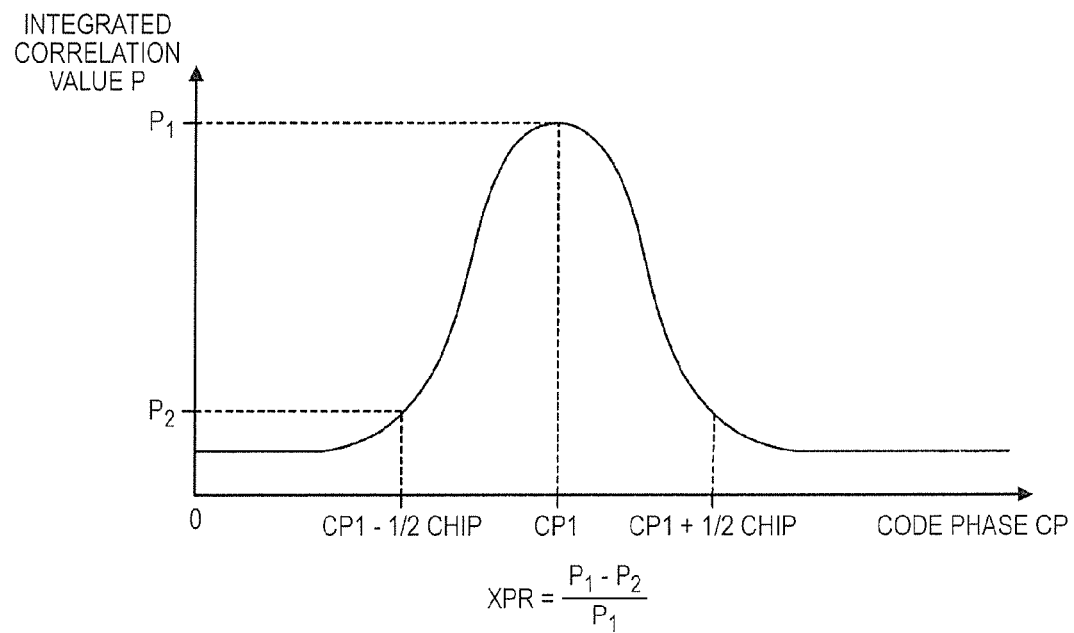
FIG. 6 is a view explaining a method of calculating an XPR.

FIG. 6 is a view explaining a method of calculating the XPR. In FIG. 6, similar to FIG. 5, the correspondence relationship between a code phase and an integrated correlation value in a predetermined frequency is schematically shown in a state where the horizontal axis indicates the code phase CP and the vertical axis indicates the integrated correlation value P. In addition, since calculation of the XPR using an average correlation value may be similarly performed, a method of calculating the XPR using the integration correlation value will be herein described.

The measurement acquisition operation section 32 acquires a maximum value '$P_1$' of the integrated correlation value, which is obtained by the correlation operation of the correlation operation section 321, and an integrated correlation value '$P_2$' that is a smaller one of integrated correlation values corresponding to code phases ½ chip distant from the code phase CP1 in which the integrated correlation value is the maximum. Then, the XPR is calculated according to the following expression (9).

$$XPR=(P_1-P_2)/P_1 \qquad (9)$$

The positioning operation section 33 performs a positioning operation of measuring the current position of the mobile phone 1 on the basis of the actual measurement value input from the measurement acquisition operation section 32. In addition, the positioning operation section 33 performs processing for determining the velocity R value or the position R value, which is used in the KF positioning processing, on the basis of the captured satellite signal reliability information input from the measurement acquisition operation section 32 or information, such as the calculated observed value 'Z' of the Kalman filter.

Figure 7:
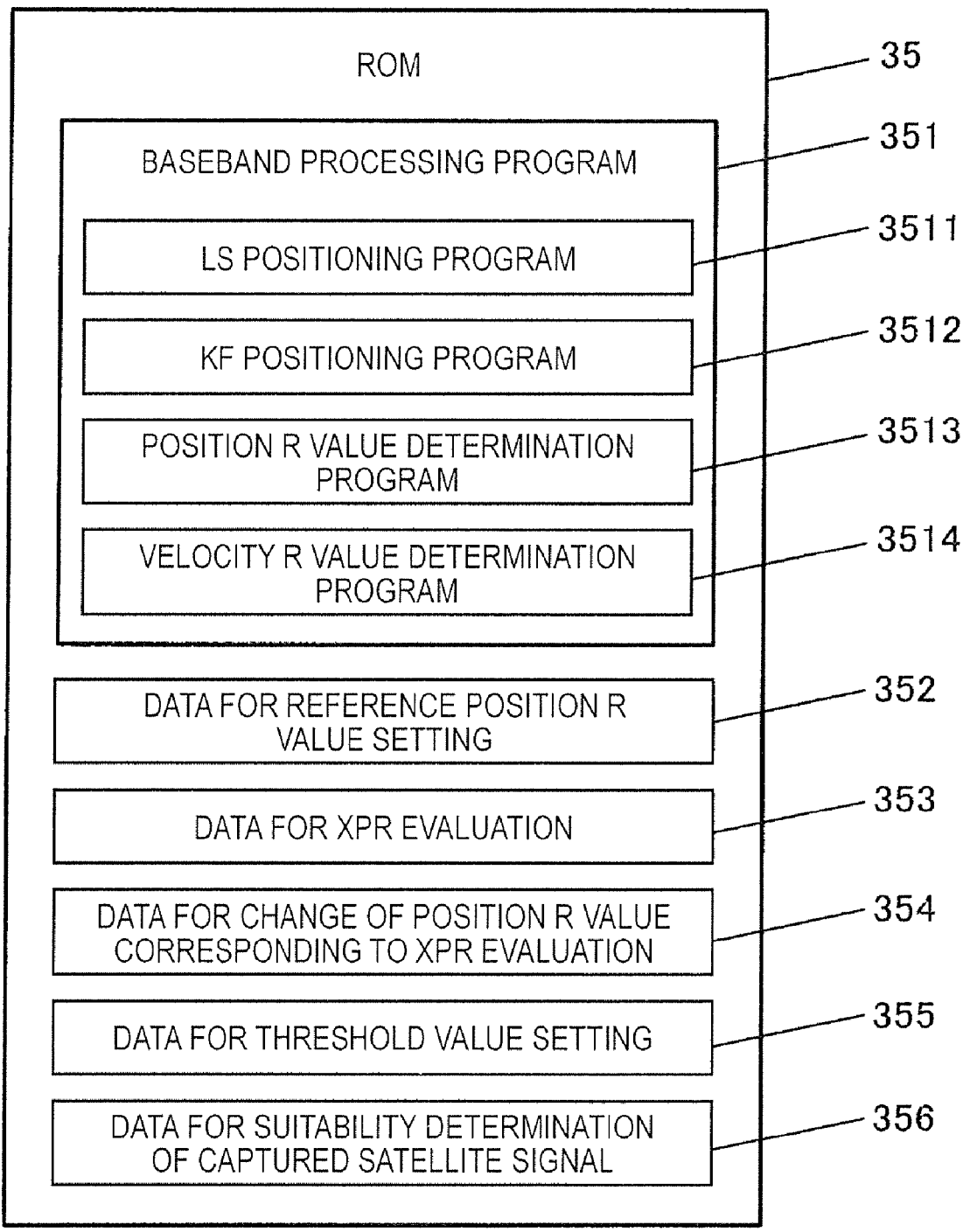
FIG. 7 is a view illustrating an example of data stored in a ROM.

FIG. 7 is a view illustrating an example of data stored in the ROM 35. A baseband processing program 351 which is read by the positioning operation section 33 and is executed as baseband processing (refer to FIG. 18), data 352 for reference position R value setting, data 353 for XPR evaluation, data 354 for change of position R value corresponding to XPR evaluation, data 355 for threshold value setting, and data 356 for suitability determination of captured satellite signal are stored in the ROM 35.

In addition, an LS positioning program 3511 executed as LS positioning processing, a KF positioning program 3512 executed as the KF positioning processing (refer to FIGS. 1 to 3), a position R value determination program 3513 executed as position R value determination processing (refer to FIG. 19), and a velocity R value determination program 3514 executed as velocity R value determination processing (refer to FIG. 20) are included as a subroutine in the baseband processing program 351.

The baseband processing is processing in which the positioning operation section 33 performs LS positioning processing in first positioning to measure the current position of the mobile phone 1 and performs KF positioning processing in second and subsequent positioning to measure the current position of the mobile phone 1 and then outputs the measured position. Details of the baseband processing will be described later using a flow chart.

The LS positioning processing is processing in which the positioning operation section 33 measures the current position of the mobile phone 1 by performing a positioning operation using the least square method for a plurality of captured satellites. Since the LS positioning processing is known, a detailed explanation will be omitted.

The KF positioning processing is processing in which the positioning operation section 33 measures the current position of the mobile phone 1 by performing a positioning operation using the Kalman filter for a plurality of captured satellites. The KF positioning processing was already explained with reference to FIGS. 1 to 3.

The position R value determination processing is processing in which the positioning operation section 33 sets a reference position R value, which is an initial value of a position R value, on the basis of the signal strength of a GPS satellite signal received from a captured satellite and then changes the reference position R value to a value corresponding to the square of the observed value 'Z' if the observed value 'Z' is larger than the set threshold value and it is determined that the captured satellite signal is not suitable. Then, the positioning operation section 33 determines the position R value by changing the reference position R value on the basis of the captured satellite signal reliability information input from the measurement acquisition operation section 32. Details of the position R value determination processing will be described later using a flow chart.

The velocity R value determination processing is processing in which the positioning operation section 33 sets a predetermined value as a velocity R value and determines a velocity R value by adding the velocity R value, which was used in the last position correction processing, to the velocity R value set initially when the reference position R value has been changed to the value corresponding to the square of the observed value 'Z'. Details of the velocity R value determination processing will be described later using a flow chart.

Figures 8, 9:
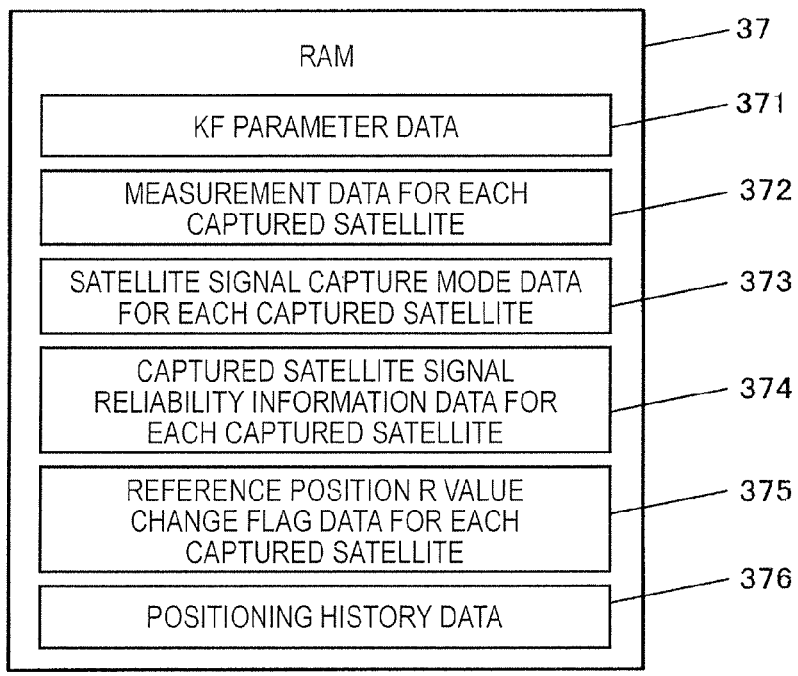
FIG. 8 is a view illustrating an example of data stored in a RAM.
FIG. 9 is a view illustrating an example of the data configuration of data for reference position R value setting.

FIG. 9 is a view illustrating an example of the data configuration of the data 352 for reference position R value setting. A signal strength 3521 which sets a range including the signal strength of the captured GPS satellite signal and a reference position R value 3523 are stored in the data 352 for reference position R value setting so as to match each other. For example, a reference position R value in the case where the signal strength is included in a range of '−140 dBm to −142 dBm' is '50 m'. The reference position R value is determined by the experiment or the like such that a maximum value thereof is necessarily smaller than the value corresponding to the square of the observed value 'Z'.

In the position R value determination processing, the positioning operation section 33 sets a reference position R value by reading the reference position R value corresponding to the range, in which the signal strength of the GPS satellite signal received from the captured satellite is included, referring to the data 352 for reference position R value setting.

Figure 10:
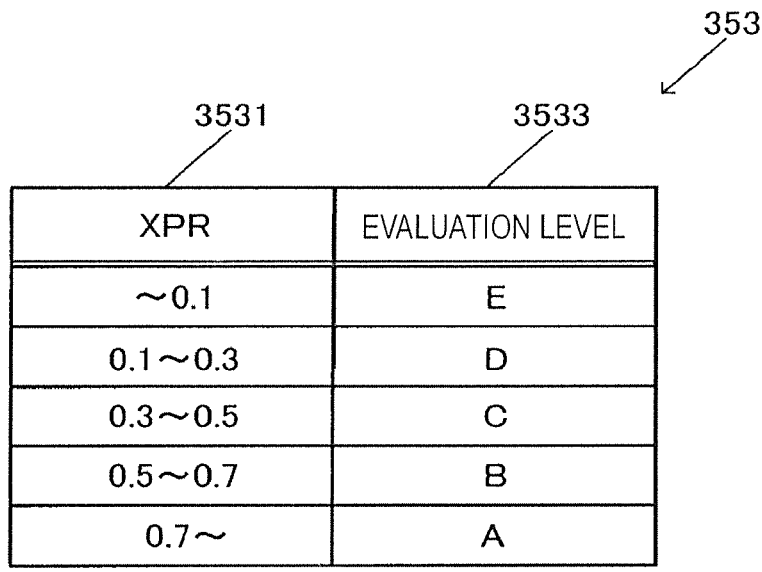
FIG. 10 is a view illustrating an example of the data configuration of data for XPR evaluation.

FIG. 10 is a view illustrating an example of the data configuration of the data 353 for XPR evaluation. An XPR 3531 which sets a range where the XPR is included and five-step evaluation levels 3533 are stored in the data 353 for XPR evaluation so as to match each other. For example, an evaluation level in a case which the XPR is included in a range of '0.3 to 0.5' is 'C'.

The measurement acquisition operation section 32 reads an evaluation level corresponding to the range, in which the XPR calculated according to the expression (9) is included, referring to the data 353 for XPR evaluation. Then, the captured satellite signal reliability information obtained by matching the calculated XPR with the read evaluation level is output to the positioning operation section 33.

Figure 11:
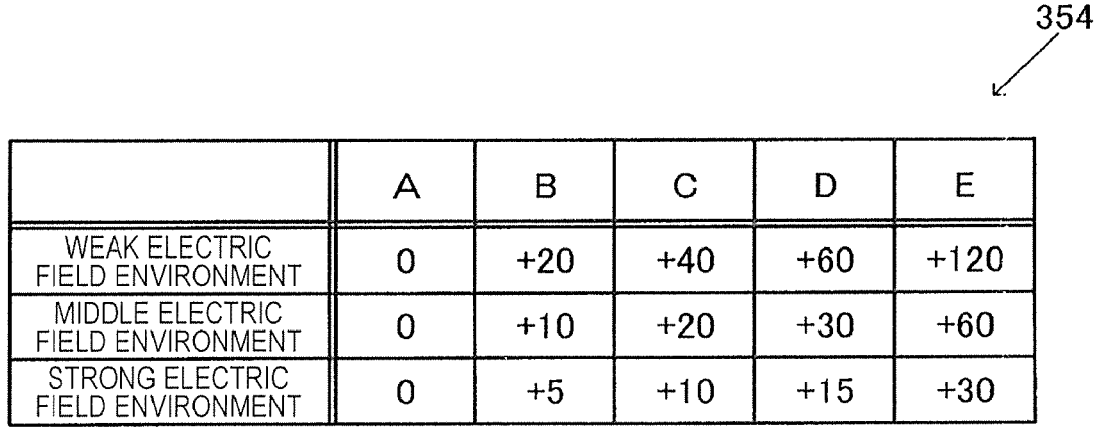
FIG. 11 is a view illustrating an example of the data configuration of data for change of position R value corresponding to XPR evaluation.

FIG. 11 is a view illustrating an example of the data configuration of the data 354 for change of position R value corresponding to XPR evaluation. In the data 354 for change of position R value corresponding to XPR evaluation, an amount added to a position R value (hereinafter, referred to as a 'position R value addition amount') is stored for each evaluation level 3533 defined in the data 353 for XPR evaluation, in each receiving environment of GPS satellite signals. For example, in the case when the receiving environment is the 'weak electric field environment' and the evaluation level is 'E', the position R value addition amount is '120'.

In the position R value determination processing, the positioning operation section 33 performs any of position R value change processing for weak electric field environment, position R value change processing for middle electric field environment, and position R value change processing for strong electric field environment according to the receiving environment of GPS satellite signals. In this case, the position R value is changed by reading a position R value addition amount corresponding to the evaluation level included in the captured satellite signal reliability information and the receiving environment referring to the data 354 for change of position R value corresponding to XPR evaluation and then adding the read position R value addition amount to the position R value.

Figure 12:
FIG. 12 is a view illustrating an example of the data configuration of data for threshold value setting.

FIG. 12 is a view illustrating the data configuration of the data 355 for threshold value setting. The data 355 for threshold value setting is data for setting a threshold value of the observed value 'Z'. A number 3551, a threshold value setting condition 3553 which is a condition for setting a threshold value, and a threshold value 3555 are stored in the data 355 for threshold value setting so as to match each other.

For example, in a case where the velocity of the mobile phone 1 is '1 m/s' or more or a case where the receiving environment of a GPS satellite signal is a 'strong electric field environment', '100 m' is set as a threshold value of the observed value 'Z'. In the case where the mobile phone 1 is moving or the case where the receiving environment of a GPS satellite signal is the 'strong electric field environment', a possibility that a positioning error will occur is low. For this reason, the threshold value is set large so that the observed value 'Z' cannot exceed the threshold value easily.

Moreover, in a case where the velocity of the mobile phone 1 is less than '1 m/s' or a case where a reference position R value change flag is set to 'ON', '20 m' is set as a threshold value. In the case where the mobile phone 1 stops or the case where the reference position R value is changed to a value corresponding to the square of the observed value 'Z' in the last position correction processing, the possibility that a positioning error will occur is high. For this reason, the threshold value of the observed value 'Z' is set small so that the observed value 'Z' can exceed the threshold value easily.

In addition, in a case where the receiving environment of the GPS satellite signal is a 'weak electric field environment' and the velocity of the mobile phone 1 is '2 m/s' or more or a case where the signal strength of a captured GPS satellite signal is less than '−155 dBm' and the velocity of the mobile phone 1 is less than '10 m/s', '50 m' is set as a threshold value of the observed value 'Z'.

In the position R value determination processing, the positioning operation section 33 determines which threshold value setting condition 3553 is satisfied by referring to the data 355 for threshold value setting. In addition, the threshold value 3555 corresponding to the threshold value setting condition 3553 that is determined to be satisfied is set as a threshold value of the observed value 'Z'. In addition, in the case where a plurality of threshold value setting conditions 3553 are satisfied simultaneously, a smallest threshold value 3555 is selected from the threshold value setting conditions 3553 and is set as a threshold value of the observed value 'Z'.

Figure 13:
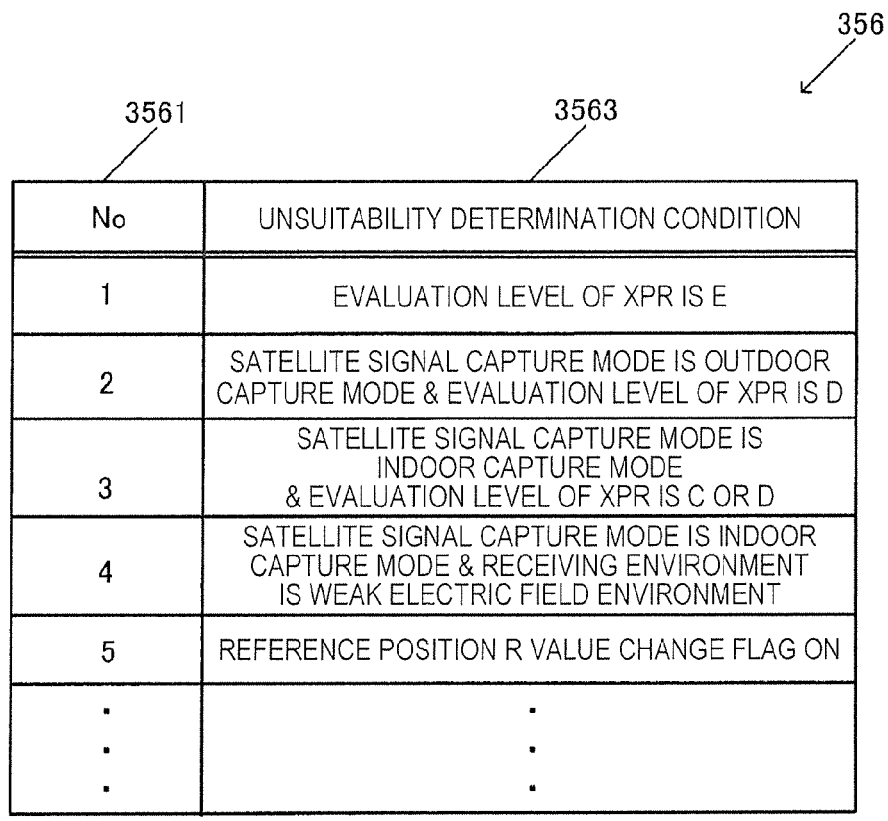
FIG. 13 is a view illustrating an example of the data configuration of data for suitability determination of captured satellite signal.

FIG. 13 is a view illustrating the data configuration of the data 356 for suitability determination of captured satellite signal. A number 3561 and an unsuitability determination condition 3563 which is a condition for determining that a captured satellite signal is unsuitable are stored in the data 356 for suitability determination of captured satellite signal so as to match each other.

For example, in a case where the evaluation level of the XPR is 'E' or a case where a satellite signal capture mode is the 'outdoor capture mode' and the evaluation level of the XPR is 'D', it is determined that the captured satellite signal is unsuitable. Furthermore, also in a case where a satellite signal capture mode is the 'indoor capture mode' and the receiving environment of a GPS satellite signal is the 'weak electric field environment', it is determined that the captured satellite signal is unsuitable. That is, the unsuitability determination condition is set such that a captured satellite signal is easily determined to be unsuitable in a case where the receiving environment of a GPS satellite signals is bad or a case where the reliability of the captured GPS satellite signal is low.

In the position R value determination processing, the positioning operation section 33 determines which unsuitability determination condition 3563 is satisfied by referring to the data 356 for suitability determination of captured satellite signal. In addition, the positioning operation section 33 determines that the captured satellite signal is suitable if any unsuitability determination condition 3563 is not satisfied and determines that the captured satellite signal is unsuitable if at least one unsuitability determination condition 3563 is satisfied.

FIG. 8 is a view illustrating an example of data stored in the RAM 37. KF parameter data 371, measurement data 372 for each captured satellite, satellite signal capture mode data 373 for each captured satellite, captured satellite signal reliability information data 374 for each captured satellite, reference position R value change flag data 375 for each captured satellite, and positioning history data 376 are stored in the RAM 37.

The KF parameter data 371 are data in which values of various parameters of the Kalman filter used in the KF positioning processing are stored and are updated by the positioning operation section 33 in the KF positioning processing as needed.

Figure 14:
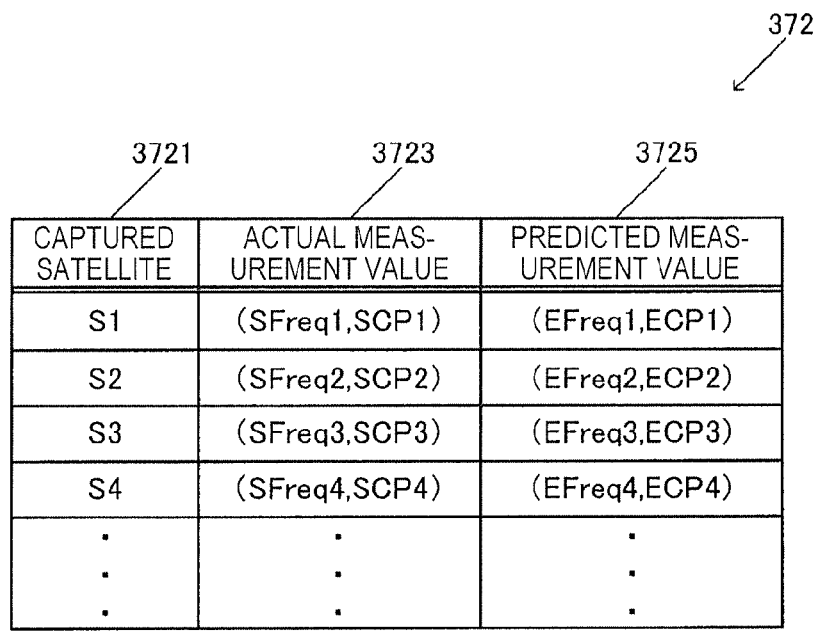
FIG. 14 is a view illustrating an example of the data configuration of measurement data for each captured satellite.

FIG. 14 is a view illustrating an example of the data configuration of the measurement data 372 for each captured satellite. A captured satellite 3721, an actual measurement value 3723, and a predicted measurement value 3725 are stored in the measurement data 372 for each captured satellite so as to match each other. The number of the captured satellite is stored in the captured satellite 3721. In addition, an actual measurement value and a predicted value of a reception frequency or code phase of the GPS satellite signal received from the captured satellite are stored in the actual measurement value 3723 and the predicted measurement value 3725, respectively.

For example, regarding a captured satellite 'S1', the reception frequency is 'SFreq1' and the code phase is 'SCP1' in the case of an actual measurement value, and the reception frequency is 'EFreq1' and the code phase is 'ECP1' in the case of a predicted measurement value. In the KF positioning processing, the positioning operation section 33 performs velocity correction processing and position correction processing by using a difference between the actual measurement value and the predicted measurement value as the observed value 'Z'.

Figure 15:
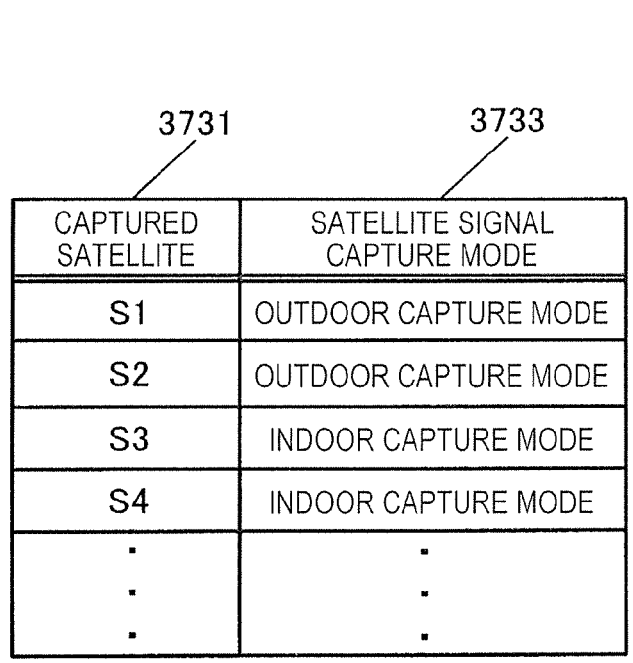
FIG. 15 is a view illustrating an example of the data configuration of satellite signal capture mode data for each captured satellite.

FIG. 15 is a view illustrating an example of the data configuration of the satellite signal capture mode data 373 for each captured satellite. A captured satellite 3731 and a satellite signal capture mode 3733 are stored in the satellite signal capture mode data 373 for each captured satellite so as to match each other. For example, a satellite signal capture mode of a captured satellite 'S3' is the 'indoor capture mode'. The satellite signal capture mode data 373 for each captured satellite is updated by the positioning operation section 33 as needed.

Figure 16:
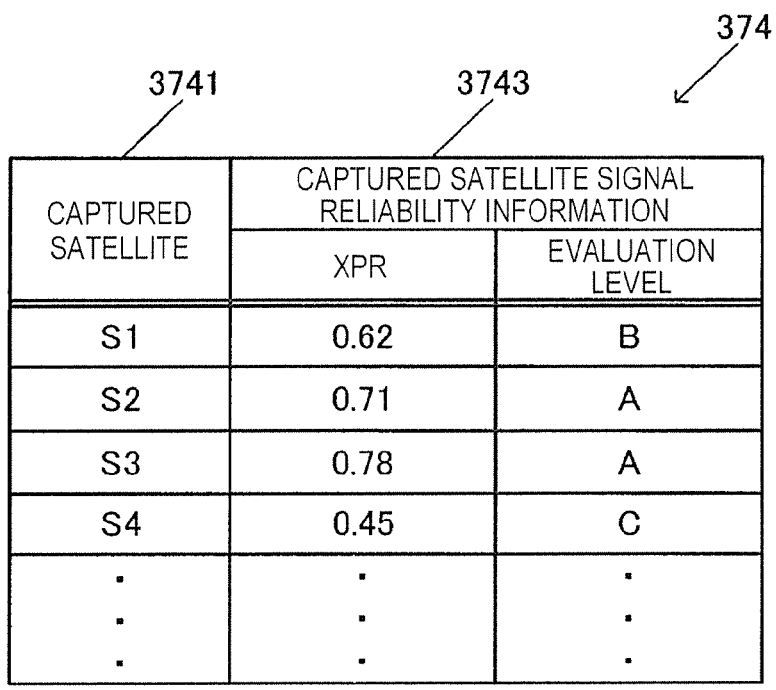
FIG. 16 is a view illustrating an example of the data configuration of captured satellite signal reliability information data for each captured satellite.

FIG. 16 is a view illustrating an example of the data configuration of the captured satellite signal reliability information data 374 for each captured satellite. A captured satellite 3741 and captured satellite signal reliability information 3743 are stored in the captured satellite signal reliability information data 374 for each captured satellite so as to match each other. In addition, an XPR and an evaluation level are stored in the captured satellite signal reliability information 3743.

For example, the XPR of the captured satellite 'S3' is '0.78' and the evaluation level is 'A'. The captured satellite signal reliability information data 374 for each captured satellite is updated as needed by causing the positioning operation section 33 to input the captured satellite signal reliability information from the measurement acquisition operation section 32.

The reference position R value change flag data 375 for each captured satellite is data in which a reference position R value change flag, which is set to 'ON' when a reference position R value is changed to a value corresponding to the square of the observed value 'Z', is stored for each captured satellite. The reference position R value change flag data 375 for each captured satellite is updated as needed in the position R value determination processing.

Figure 17:
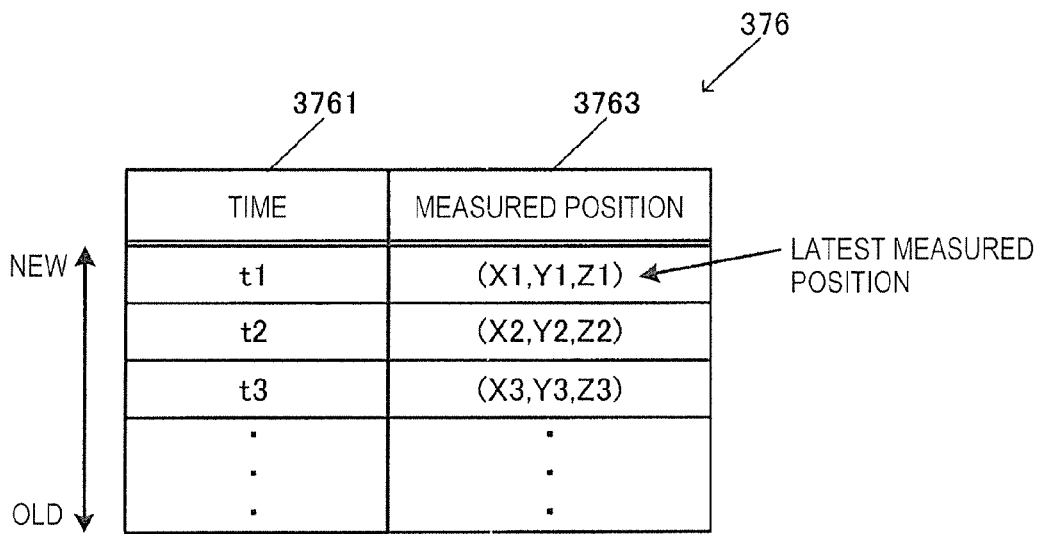
FIG. 17 is a view illustrating an example of the data configuration of positioning history data.

FIG. 17 is a view illustrating an example of the data configuration of the positioning history data 376. In the positioning history data 376, a time 3761 when the measured position is determined and its measured position 3763 are stored in the new order so as to match each other. Of the positioning history data 376, the measured position 3763 corresponding to the latest time 3761 is referred to as a 'latest measured position'.

For example, the latest measured position in FIG. 17 is measured position (X1, Y1, Z1) at time 't1'. The positioning history data 376 is updated as needed by causing the positioning operation section 33 to perform positioning processing.

The TCXO 40 is a temperature compensated crystal oscillator which generates an oscillation signal at a predetermined oscillation frequency and outputs the generated oscillation signal to the RF receiving circuit section 21 and the baseband processing circuit section 30.

The host CPU 50 is a processor which makes an overall control of the sections of the mobile phone 1 according to various programs, such as a system program, stored in the ROM 100. The host CPU 50 displays, on the display section 70, a navigation screen on which the latest measured position input from the positioning operation section 33 is plotted.

The operating section 60 is an input device configured to include a touch panel or a button switch, for example, and outputs a signal corresponding to a pressed key or button to the host CPU 50. By the operation of the operating section 60, various kinds of instruction input, such as a call request or a mail transmission or reception request, are performed.

The display section 70 is a display device which is formed by using an LCD (liquid crystal display), for example, and performs various kinds of display on the basis of a display signal input from the host CPU 50. A navigation screen, time information, and the like are displayed on the display section 70.

The mobile phone antenna 80 is an antenna used to perform transmission and reception of a radio signal for mobile phones between the mobile phone 1 and a base station provided by a communication service provider of the mobile phone 1.

The radio communication circuit section 90 for mobile phone is a communication circuit section of a mobile phone configured to include an RF conversion circuit, a baseband processing circuit, and the like and realizes transmission and reception of a call or mail by performing modulation, demodulation, and the like of the radio signal for mobile phones.

The ROM 100 stores a system program, which is used when the host CPU 50 controls the mobile phone 1, and various programs or data used to realize a navigation function, and the like.

The RAM 110 forms a work area in which the system program executed by the host CPU 50, various processing programs, data being processed in various kinds of processing, a processing result, and the like are temporarily stored.

3. Flow of Processing

Figure 18:
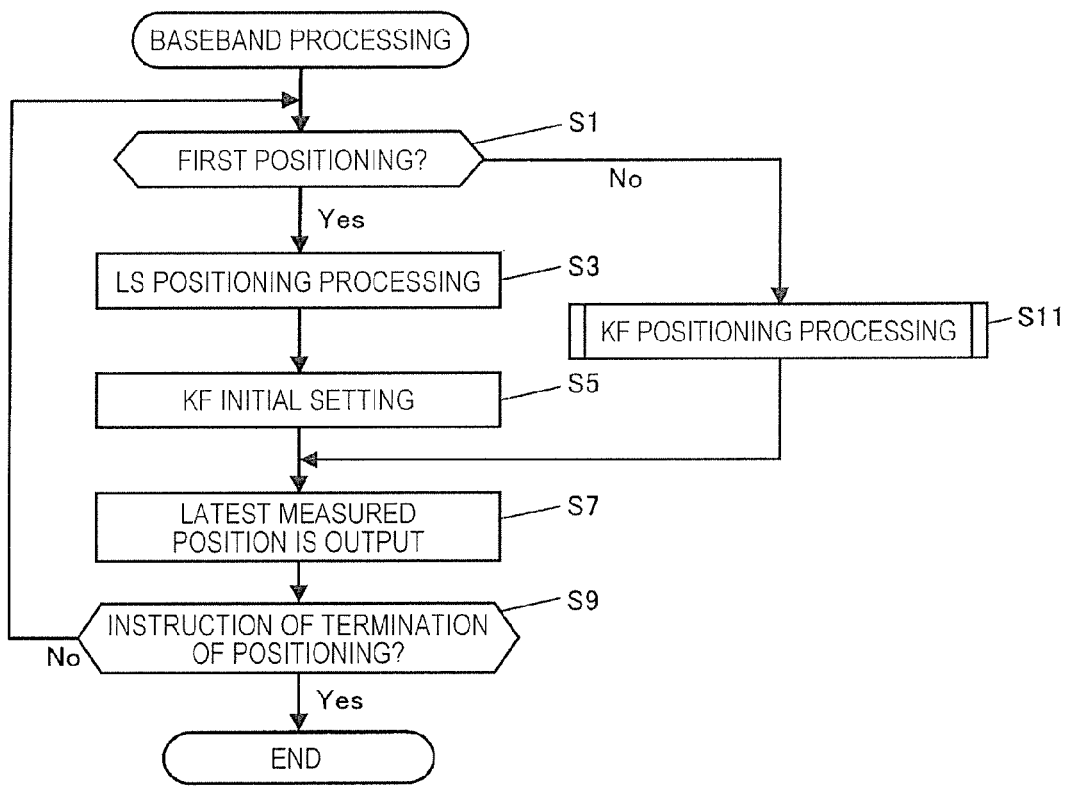
FIG. 18 is a flow chart illustrating the flow of baseband processing.

FIG. 18 is a flow chart illustrating the flow of baseband processing executed in the mobile phone 1 when the positioning operation section 33 reads and executes the baseband processing program 351 stored in the ROM 35.

The baseband processing is processing executed when the RF receiving circuit section 21 receives a GPS satellite signal and the positioning operation section 33 detects that an operation of instructing the start of positioning has been performed in the operating section 60, and is processing executed together with various kinds of processing called execution of various applications. In addition, execution of the processing may also be started when a power supply operation of the mobile phone 1 is detected in a condition where ON/OFF of a power supply of the mobile phone 1 and start/stop of a GPS are simultaneously performed. In principle, the positioning operation is assumed to be performed every '1 second'.

Furthermore, although not particularly described, it is assumed that being under execution of the baseband processing is a state where receiving of an RF signal using the GPS antenna 10, down-conversion to an IF signal using the RF receiving circuit section 21, and acquisition and calculation of an actual measurement value or captured satellite signal reliability information using the measurement acquisition operation section 32 are performed as needed.

First, the positioning operation section 33 determines whether or not positioning is performed first (step S1). If it is determined that the positioning is performed first (step S1; Yes), the positioning operation section 33 performs LS positioning processing by reading and executing the LS positioning program 3511 stored in the ROM 35 (step S3).

In the LS positioning processing, the positioning operation section 33 measures the current position of the mobile phone 1 by performing a positioning operation using the least square method for a plurality of captured satellites. Then, the positioning operation section 33 stores the time 3761 and the measured position 3763 in the positioning history data 376 of the RAM 37 so as to match each other.

Subsequently, the positioning operation section 33 performs initial setting of a Kalman filter (step S5). Specifically, the positioning operation section 33 sets the measured position obtained in the LS positioning processing as a position element of a state vector 'X' of the Kalman filter. In addition, predetermined values are set for each element of an error covariance matrix 'P' and other elements of the state vector 'X' and are then stored in the KF parameter data 371 of the RAM 37.

Then, the positioning operation section 33 outputs the latest measured position, which is stored in the positioning history data 376 of the RAM 37, to the host CPU 50 (step S7). Then, it is determined whether or not the user has instructed termination of positioning using the operating section 60 (step S9). If it is determined that the termination of positioning is not instructed (step S9; No), the process returns to step S1. In addition, if it is determined that the termination of positioning has been instructed (step S9; Yes), the baseband processing is completed.

On the other hand, if it is determined that the positioning is not the first positioning in step S1 (step S1; No), the positioning operation section 33 performs KF positioning processing by reading and executing the KF positioning program 3512 stored in the ROM 35 (step S11). Then, the positioning operation section 33 moves the processing to step S7.

In the KF positioning processing, the positioning operation section 33 executes processing according to the flow chart of FIGS. 1 to 3. In this case, in step C11 of the position correction processing shown in FIG. 3, the positioning operation section 33 performs the position R value determination processing by reading and executing the position R value determination program 3513 stored in the ROM 35.

Figure 19:
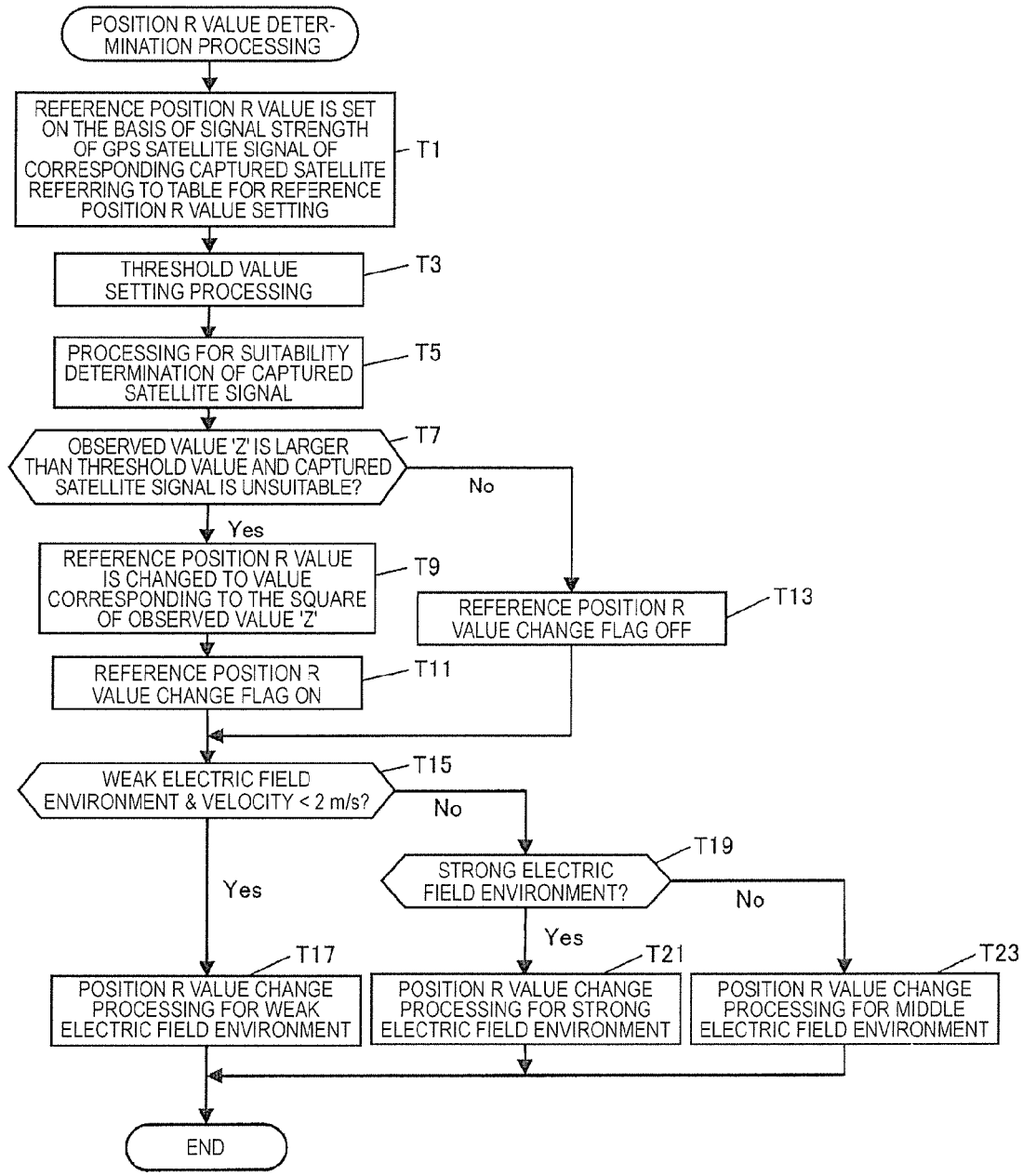
FIG. 19 is a flow chart illustrating the flow of position R value determination processing.

FIG. 19 is a flow chart illustrating the flow of position R value determination processing.

First, the positioning operation section 33 calculates the reference position R value 3523 corresponding to the signal strength 3521 of a GPS satellite signal of the captured satellite referring to the table 352 for reference position R value setting stored in the ROM 35 and sets the calculated reference position R value 3523 as an initial value of the position R value (step T1).

Subsequently, the positioning operation section 33 performs threshold value setting processing (step T3). Specifically, the positioning operation section 35 determines which threshold value setting condition 3553 is satisfied by referring to the data 355 for threshold value setting stored in the ROM 35. In addition, the threshold value 3555 corresponding to the threshold value setting condition 3553 that is determined to be satisfied is read to be set as a threshold value of the observed value 'Z' regarding the code phase.

Then, the positioning operation section 33 performs processing for determining whether or not a captured satellite signal is suitable (step T5). Specifically, the positioning operation section 33 determines which unsuitability determination condition 3563 is satisfied by referring to the data 356 for suitability determination of captured satellite signal stored in the ROM 35. In addition, the positioning operation section 33 determines that the captured satellite signal is suitable if any unsuitability determination condition 3563 is not satisfied and determines that the captured satellite signal is unsuitable if at least one unsuitability determination condition 3563 is satisfied.

Then, the positioning operation section 33 determines whether or not the observed value 'Z' is larger than the threshold value set in step T3 and the determination result of the captured satellite signal obtained in step T5 is unsuitable (step T7). If it is determined that the above conditions are satisfied (step T7; Yes), the reference position R value set in step T1 is changed to a value corresponding to the square of the observed value 'Z' (step T9).

Then, the positioning operation section 33 sets a reference position R value change flag of the captured satellite to 'ON' (step T11) and updates the reference position R value change flag data 375 for each captured satellite stored in the RAM 37.

On the other hand, if it is determined that the above conditions are not satisfied in step T7 (step T7; No), the positioning operation section 33 sets the reference position R value change flag of the captured satellite to 'OFF' (step T13) and updates the reference position R value change flag data 375 for each captured satellite stored in the RAM 37.

Then, the positioning operation section 33 determines whether or not the receiving environment of a GPS satellite signal is a 'weak electric field environment' and the velocity of the mobile phone 1 obtained in the velocity correction processing (step A3 of FIG. 1 and FIG. 2) is less than '2 m/s' (step T15). If it is determined that the above conditions are satisfied (step T15; Yes), position R value change processing for weak electric field environment is performed (step T17).

Specifically, referring to the data 354 for change of position R value corresponding to XPR evaluation stored in the ROM 35, a position R value addition amount corresponding to an evaluation level of the captured satellite stored in the captured satellite signal reliability information data 374 for each captured satellite of the RAM 37 is read from position R value addition amounts set in a condition where a receiving environment is the 'weak electric field environment'. Then, the position R value is changed by adding the read position R value addition amount to the position R value.

On the other hand, if it is determined that the above conditions are not satisfied in step T15 (step T15; No), the positioning operation section 33 determines whether or not the receiving environment of a GPS satellite signal is a 'strong electric field environment' (step T19). If it is determined that the receiving environment is the 'strong electric field environment' (step T19; Yes), position R value change processing for strong electric field environment is performed (step T21). In addition, if it is determined that the receiving environment is not the 'strong electric field environment' in step T19 (step T19; No), position R value change processing for middle electric field environment is performed (step T23).

In the position R value change processing for strong electric field environment and the position R value change processing for middle electric field environment, the positioning operation section 33 changes a position R value by reading a position R value addition amount, which corresponds to the evaluation level of the captured satellite, from position R value addition amounts, which are under the 'strong electric field environment' when the receiving environment is the position R value change processing for strong electric field environment and under the 'middle electric field environment' when the receiving environment is the position R value change processing for middle electric field environment, among the data 354 for change of position R value corresponding to XPR evaluation stored in the ROM 35 and then adding the read position R value addition amount to the position R value.

After performing any one of processing in steps T17, T21 and T23, the positioning operation section 33 determines the position R value after change as a final position R value, completing the position R value determination processing.

In addition, in step B11 of the velocity correction processing shown in FIG. 2, the positioning operation section 33 performs the velocity R value determination processing by reading and executing the velocity R value determination program 3514 stored in the ROM 35.

Figure 20:
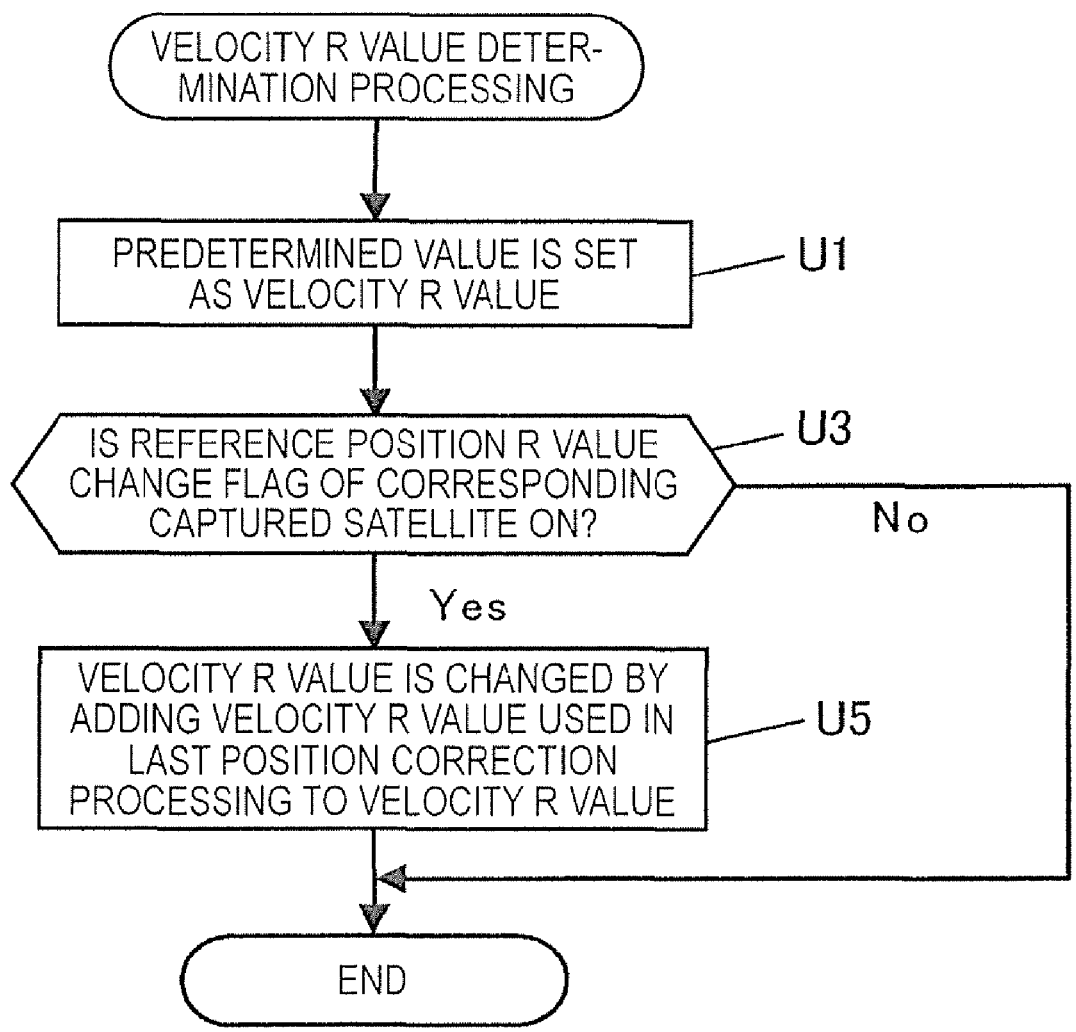
FIG. 20 is a flow chart illustrating the flow of velocity R value determination processing.

FIG. 20 is a flow chart illustrating the flow of velocity R value determination processing.

First, the positioning operation section 33 sets a predetermined value as the velocity R value (step U1). Then, the positioning operation section 33 determines whether or not the reference position R value change flag of the captured satellite is set to 'ON' by referring to the reference position R value change flag data 375 for each captured satellite of the RAM 37 (step U3).

Then, if it is determined that the reference position R value change flag is set to 'OFF' (step U3; No), the positioning operation section 33 completes the velocity R value determination processing. In addition, if it is determined that the reference position R value change flag is set to 'ON' (step U3; Yes), the positioning operation section 33 changes the velocity R value by adding the velocity R value used in the last position correction processing to the velocity R value set in step U1 (step U5). Then, the positioning operation section 33 completes the velocity R value determination processing.

A state where the reference position R value change flag is set to 'ON' means that the observed value 'Z' regarding a code phase is larger than a threshold value and a captured satellite signal is determined to be unsuitable in the last position R value determination processing. In this case, a possibility that the observed value 'Z' regarding a reception frequency used in the velocity correction processing will also be a large value is high, and a possibility that a velocity obtained by correction will also include an error is high. Therefore, in the case when the reference position R value change flag is set to 'ON', the velocity R value is made large by adding the velocity R value used in the last position correction processing to the velocity R value set in step U1, such that the velocity can be calculated with high precision.

4. Experimental Result

Figure 21:
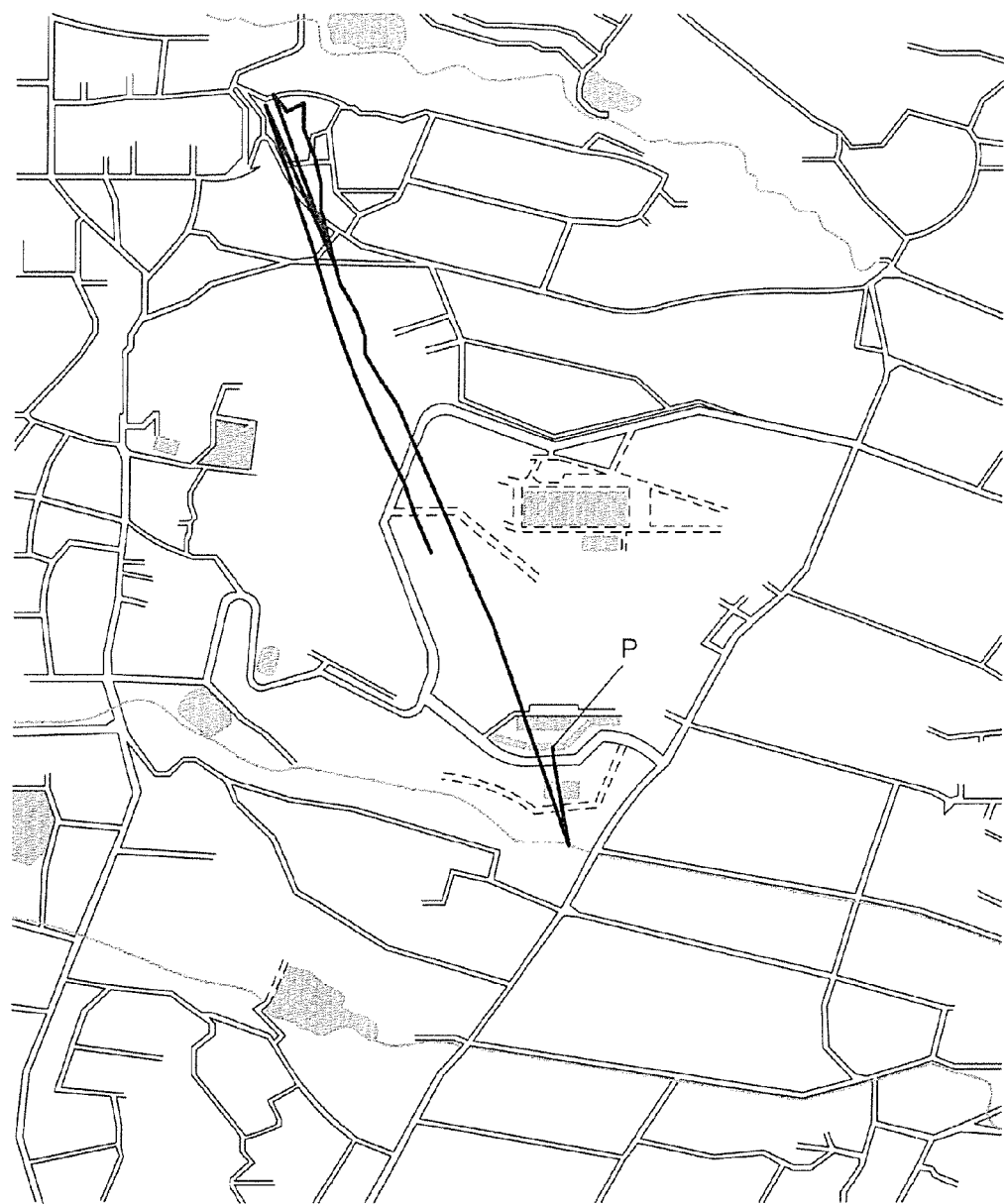
FIG. 21 is a view illustrating an example of an experimental result in known positioning processing.
Figure 22:
FIG. 22 is a view illustrating an example of an experimental result in positioning processing according to the present embodiment.

FIG. 21 is a view illustrating an example of an experimental result when positioning is performed in known processing, and FIG. 22 is a view illustrating an example of an experimental result when positioning is performed in processing according to the present embodiment. In each of the drawings, there is shown a result obtained by connecting, with a thick solid line, a measured position corresponding to each time in a case where a user who carries the mobile phone 1 stops in a building P where a window exists in only one side. This is an experimental result in the environment where positioning is relatively difficult.

As is apparent from FIGS. 21 and 22, it can be seen that the measured position is calculated more accurately by processing according to the present embodiment. In the known processing, it can be seen that the measured position does not converge on the position of a building P but position jump to the position far from the building P occur even though the mobile phone 1 stops. On the other hand, in the processing according to the present embodiment, it can be seen that the measured position concentrates near the position of the building P, such that the position of the mobile phone 1 is measured approximately accurately.

5. Operations and Effects

According to the present embodiment, capture processing for capturing a GPS satellite signal from a GPS satellite is executed to measure a distance-equivalent value. Furthermore, an initial value of the position R value used in the position correction processing regarding the captured satellite is set on the basis of the signal strength of the captured GPS satellite signal. However, the position R value used in the position correction processing is set to a larger value than the initial value when it is determined that the observed value 'Z' of the captured satellite is unsuitable by an unsuitability determination condition set on the basis of the receiving environment of the GPS satellite signal from the GPS satellite.

On the basis of the signal strength of the GPS satellite signal captured, an approximate value of a position R value included in the observed value 'Z' is predicted to be set as an initial value. However, when it is determined that performing the position correction processing using the observed value 'Z' of the captured satellite is not suitable, it becomes possible to perform the position correction processing using a more suitable position R value by setting the position R value to a larger value than the initial value. As a result, the positioning accuracy can be further improved.

6. Modifications 6-1. Electronic Apparatus

The invention may be applied to any kind of electronic apparatus as long as the electronic apparatus includes a positioning device. For example, the invention may also be applied similarly to a notebook computer, a PDA (personal digital assistant), a car navigation apparatus, and the like.

6-2. Satellite Positioning System

In the above embodiment, an explanation has been made using a GPS as an example of a satellite positioning system. However, other satellite positioning systems, such as a WAAS (wide area augmentation system), a QZSS (quasi zenith satellite system), a GLONASS (global navigation satellite system), and a GALILEO, may also be used.

6-3. Division of Processing

It is possible to make the host CPU 50 execute some or all of processing executed by the positioning operation section 33. For example, the host CPU 50 is made to perform position R value determination processing and velocity R value determination processing, and the positioning operation section 33 is made to perform positioning processing using a position R value and a velocity R value that are determined. Alternatively, the host CPU 50 may be made to execute all processing including LS positioning processing and KF positioning processing executed by the positioning operation section 33.

6-4. Setting of a Reference Position R Value

In the above embodiment, a case in which the reference position R value is changed to a value corresponding to the square of the observed value 'Z' when the observed value 'Z' is larger than a threshold value and the captured satellite signal is determined to be unsuitable has been described. However, the reference position R value may also be changed to a value corresponding to the cube of the observed value 'Z', for example. Alternatively, it is also possible to set a very large constant as a predetermined maximum reference position R value 'RMAX' beforehand and to change the reference position R value to the maximum reference position R value 'RMAX'.

6-5. Position R Value Change Processing Based on Receiving Environment

In the above embodiment, a case in which processing for changing the position R value is performed on the basis of the receiving environment of the GPS satellite signal and the velocity of the mobile phone 1 in steps T15 to T23 has been described. However, the processing in steps T15 to T23 may be omitted.

In addition, the position R value may be changed on the basis of the angle of elevation of a captured satellite. Specifically, data for change of position R value corresponding to angle of elevation in which a position R value addition amount and an angle of elevation of a captured satellite are made to match for each receiving environment of a GPS satellite signal is stored in the ROM 35. In addition, the position R value is changed by reading a position R value addition amount, which corresponds to the angle of elevation of the captured satellite in each receiving environment, and then adding the read position R value addition amount to the position R value in the processing of steps T17, T21, and T23.

In addition, the correspondence relationship between the angle of elevation and the position R value addition amount is preferably set in the data for change of position R value corresponding to angle of elevation such that the position R value addition amount corresponding to the same angle of elevation is largest when the receiving environment is the 'weak electric field environment' and smallest when the receiving environment is the 'strong electric field environment'.

6-6. Determination of an Evaluation Level

In the above embodiment, a case in which the measurement acquisition operation section 32 performs calculation of the XPR and determination of the evaluation level has been described. However, the positioning operation section 33 may determine the evaluation level on the basis of the XPR calculated by the measurement acquisition operation section 32.

6-7. Change of a Position R Value Based on Reliability of a Captured Satellite Signal In the above embodiment, a case in which the position R value is changed on the basis of the evaluation level determined from the XPR has been described. However, the position R value may be directly changed on the basis of the XPR without using the evaluation level. In this case, the position R value is changed by storing data for change of position R value corresponding to XPR, in which the correspondence relationship between the XPR and the position R value addition amount is set, in the ROM 35 and then adding the position R value addition amount read from the data for change of position R value corresponding to XPR to the position R value.

What is claimed is:

1. A positioning method, comprising:
    determining a receiving environment of a satellite signal from a positioning satellite;
    predicting a state vector including a position of a positioning device and a velocity of the positioning device based on the satellite signal;
    predicting a first distance-equivalent value indicating a distance between the positioning satellite and the positioning device;
    measuring a second distance-equivalent value indicating a predicted value of the distance between the positioning satellite and the positioning device;

calculating an observed value indicating a difference between the first distance-equivalent value and the second distance-equivalent value;

setting a first measurement error for the positioning satellite based on a signal strength of the satellite signal;

setting a suitability condition of the observed value based on the receiving environment;

setting a second measurement error larger than the first measurement error when the observed value is not suitable by the suitability condition;

setting the second measurement error equal to the first measurement error when the observed value is suitable by the suitability condition;

correcting the state vector using the observed value and the second measurement error being larger than the first measurement error, when the observed value is not suitable by the suitability condition; and correcting the state vector using the observed value and the second measurement error being equal to the first measurement error, when the observed value is suitable by the suitability condition.

2. A program causing a computer provided in a positioning device to execute the positioning method according to claim 1.

3. A positioning method, comprising:

predicting a state vector including a position of a positioning device and a velocity of the positioning device based on a satellite signal;

predicting a first reception frequency of the satellite signal;

measuring a second reception frequency of the satellite signal;

calculating a velocity of the positioning device based on a difference between the first reception frequency and the second reception frequency;

predicting a first distance-equivalent value indicating a distance between a positioning satellite and the positioning device;

measuring a second distance-equivalent value indicating a predicted value of the distance between the positioning satellite and the positioning device;

calculating an observed value indicating a difference between the first distance-equivalent value and the second distance-equivalent value;

setting a first measurement error for the positioning satellite based on a signal strength of the satellite signal;

setting a suitability condition of the observed value based on the calculated velocity;

setting a second measurement error larger than the first measurement error when the observed value is not suitable by the suitability condition;

setting the second measurement error equal to the first measurement error when the observed value is suitable by the suitability condition;

correcting the state vector using the observed value and the second measurement error being larger than the first measurement error, when the observed value is not suitable by the suitability condition; and correcting the state vector using the observed value and the second measurement error being equal to the first measurement error, when the observed value is suitable by the suitability condition.

4. A positioning method, comprising:

predicting a state vector including a position of a positioning device and a velocity of the positioning device based on a satellite signal;

evaluating a reliability of the satellite signal based on the correlation value by correlating the satellite signal and a replica signal;

predicting a first distance-equivalent value indicating a distance between a positioning satellite and the positioning device;

measuring a second distance-equivalent value indicating a distance between the positioning satellite and the positioning device;

calculating an observed value indicating a difference between the first distance-equivalent value and the second distance-equivalent value;

setting a first measurement error for the positioning satellite based on a signal strength of the satellite signal;

setting a suitability condition of the observed value based on the reliability;

setting a second measurement error larger than the first measurement error when the observed value is not suitable by the suitability condition; and setting the second measurement error equal to the first measurement error when the observed value is suitable by the suitability condition;

correcting the state vector using the observed value and the second measurement error being larger than the first measurement error, when the observed value is not suitable by the suitability condition; and correcting the state vector using the observed value and the second measurement error being equal to the first measurement error, when the observed value is suitable by the suitability condition.

* * * * *